US012651733B2

(12) United States Patent
Thöing et al.

(10) Patent No.: US 12,651,733 B2
(45) Date of Patent: Jun. 9, 2026

(54) HIGH-DYNAMIC RANGE SCANS (PARTITIONING METHOD)

(71) Applicant: Thermo Fisher Scientific (Bremen) GmbH, Bremen (DE)

(72) Inventors: Christian Thöing, Bremen (DE); Alexander Makarov, Bremen (DE); Denis Chernyshev, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 488 days.

(21) Appl. No.: 18/448,704

(22) Filed: Aug. 11, 2023

(65) Prior Publication Data

US 2024/0055246 A1 Feb. 15, 2024

(30) Foreign Application Priority Data

Aug. 12, 2022 (GB) ..................................... 2211790

(51) Int. Cl.
*H01J 49/00* (2006.01)

(52) U.S. Cl.
CPC ................................ *H01J 49/0036* (2013.01)

(58) Field of Classification Search
CPC .... H01J 49/0036; H01J 49/0027; H01J 49/26; H01J 49/0031; H01J 49/4265;
(Continued)

(56) References Cited

U.S. PATENT DOCUMENTS 7,157,698 B2 1/2007 Makarov et al.
7,342,224 B2 3/2008 Makarov et al.
(Continued)

FOREIGN PATENT DOCUMENTS

EP 4002423 A1 * 5/2022 .............. H01J 49/40
GB 2585372 A 1/2021
(Continued)

OTHER PUBLICATIONS

Southam et al., "Dynamic range and mass accuracy of wide-scan direct infusion nanoelectrospray Fourier transform ion cyclotron resonance mass spectrometry-based metabolomics increased by the spectral stitching method," Analytical Chemistry, 79(12): 4595-4602 (2007).
(Continued)

*Primary Examiner* — Michael Maskell
(74) *Attorney, Agent, or Firm* — Klarquist Sparkman, LLP

(57) ABSTRACT

Methods for acquiring mass spectral data of a sample across at least a portion of an m/z range include receiving mass spectral data of the sample across the m/z range. The m/z range is partitioned into one or more sets of m/z sub-ranges, each set comprising one or more m/z sub-ranges, by dividing the m/z range into a plurality of m/z bins, determining an indication of ion abundance for each m/z bin, based on the mass spectral data, and forming an m/z sub-range of the one or more sets of m/z sub-ranges by assigning m/z bins having ion abundances that correspond to at least a threshold degree to the formed m/z sub-range. A mass analysis is performed on the sample for each set of m/z sub-ranges, thereby acquiring one or more partial mass spectral data sets.

26 Claims, 8 Drawing Sheets

(58) Field of Classification Search

CPC ........ G01N 27/62; G01N 30/02; G01N 30/06; G01N 30/72; G01N 30/74; G01N 30/8679; G01N 2030/065

USPC .................................................. 250/281, 282

See application file for complete search history.

(56) References Cited

U.S. PATENT DOCUMENTS

| | | | |
|---|---|---|---|
| 7,999,223 | B2 | 8/2011 | Makarov et al. |
| 8,809,770 | B2 | 8/2014 | Bonner et al. |
| 9,064,679 | B2 | 6/2015 | Makarov |
| 9,147,563 | B2 | 9/2015 | Makarov |
| 9,269,553 | B2 | 2/2016 | Bonner et al. |
| 9,293,316 | B2 | 3/2016 | Kovtoun et al. |
| 9,543,134 | B2 | 1/2017 | Bonner et al. |
| 9,812,310 | B2 | 11/2017 | Kovtoun et al. |
| 10,199,208 | B2 | 2/2019 | Grinfeld et al. |
| 10,224,193 | B2 | 3/2019 | Makarov |
| 10,593,530 | B2 | 3/2020 | Thoeing et al. |

FOREIGN PATENT DOCUMENTS

| | | | |
|---|---|---|---|
| WO | 2006129083 | A2 | 12/2006 |
| WO | 2016196432 | A1 | 12/2016 |
| WO | 2018134346 | A1 | 7/2018 |

OTHER PUBLICATIONS

Meier et al., "BoxCar acquisition method enables single-shot proteomics at a depth of 10,000 proteins in 100 minutes," Nature Methods, 15(6): 440-448 (2018).

Combined Search and Examination Report under Sections 17 & 18(3) for related GB Application No. 2211790.7 dated Feb. 14, 2023, 7 pages.

* cited by examiner

HIGH-DYNAMIC RANGE SCANS (PARTITIONING METHOD)

CROSS REFERENCE TO RELATED APPLICATION

This application claims priority from application GB2211790.7, filed Aug. 12, 2022. The entire disclosure of application GB2211790.7 is incorporated herein by reference.

FIELD

The present disclosure concerns methods for acquiring mass spectral data of a sample across a mass-to-charge ratio (m/z) range. This disclosure also relates to mass spectrometry systems for performing such methods.

BACKGROUND

In mass spectrometers using an ion trap-based mass analyser, such as Orbitrap™ mass spectrometers manufactured by Thermo Fisher Scientific™, the number of ions entering the analyser should be limited to a certain range to avoid undesired effects due to overfilling of the trap, such as space-charge effects. In Orbitrap™ instruments, typically a trap (C-trap) injects ions into an orbital trapping mass analyser. Such a trap is often termed an "extraction trap". Typical target values for the number of ions or total ion current (TIC) in a full mass spectrometry (MS) scan on orbital trapping instruments are in the range $1\times10^6$ to $3\times10^6$. However, this imposed upper limit naturally also limits the dynamic range of mass spectrometric scans as well as the signal-to-noise (S/N) ratios that can be achieved for lower-abundant analytes in the sample. This drawback becomes particularly pronounced in the analysis of biological samples, which are often dominated by a few species of very high abundance. For example, in human blood plasma, the protein serum albumin constitutes ~50% of plasma protein. An effective analysis of lower-abundant species in the sample either requires a removal of the dominant species (which may not be possible under all circumstances), or an increased dynamic range to resolve both high- and low-abundant species.

To record a normal full scan covering a broad m/z range, ions derived from a sample are accumulated in a trap (e.g. a C-trap) for a certain amount of time and then injected into a mass analyser (e.g. an orbital trapping mass analyser). The total time period during which ions are accumulated (referred to herein as an "injection time") is typically determined by an automatic gain control (AGC) mechanism, which controls the accumulation time in the C-trap. The AGC typically utilises both the observed TIC of the m/z range of interest as well as the associated injection time of a previous scan (e.g., full scan or short low-resolution "pre-scan") but may also make use of an additional electrometer device to estimate the injection time that is necessary to reach a specified number of ions (also referred to as AGC target value) in the ion trap. Like the TIC itself, the resulting injection time is mainly determined by the most abundant species in the sample. Considering that the injection time applies to all sample constituents equally and that typically all ions from the m/z range enter the ion trap simultaneously, species of lower abundance will either not be resolved at all or will be detected at a low S/N ratio, thus limiting the dynamic range of the analysis.

Approaches to increasing the S/N ratios of m/z ranges as well as the overall dynamic range of MS scans have been described previously. WO-2006/129083 describes a method comprising the sequential injection of ions from multiple selected m/z ranges, followed by the mass analysis of the combined sample of ions, and using an AGC mechanism to achieve a target number of ions.

A. D. Southam et al. (*Anal. Chem.* 2007, 79, 4595) describes a method to increase the dynamic range for Fourier transform ion cyclotron resonance (FT-ICR) mass spectrometry, specifically direct infusion nano-electrospray applications, comprising the successive injection and mass analysis of multiple adjacent, overlapping m/z windows, followed by stitching of these windows to produce a contiguous full scan spectrum. The method includes a dedicated stitching algorithm, which primarily aims at retaining or even improving the high mass accuracy of the FT-ICR mass spectrometer.

F. Meier et al. (*Nat. Methods* 2018, 15, 440) describe an acquisition method termed "BoxCar" and WO-2018/134346 describes similar approaches. These publications aim at increasing the S/N of lower-abundant species and the overall dynamic range of full scans by sequentially injecting ions from partitions of the full scan m/z range and performing mass analyses on two or more combined samples of ions, which can later be stitched together by a post-processing algorithm to produce a full scan spectrum. Specifically, a wide m/z range is partitioned into multiple adjacent, overlapping m/z windows, which are assigned to two or more "BoxCar scans" (partial spectra) in an alternating fashion. For example, with two BoxCar scans, windows #1, #3, #5, . . . are assigned to scan #1, windows #2, #4, #6, . . . are assigned to scan #2. For each scan, the ions from the allotted windows are injected sequentially and then measured collectively in the mass analyser. F. Meier et al. focuses on proteomics applications and the authors demonstrate an improved performance compared to standard full scans on the Q Exactive™ HF with respect to the sensitivity and the number of detected proteins per unit of time.

The BoxCar method (WO-2018/134346) seeks to provide an approach for replacing standard full scans without interfering with established workflows (such as data-dependent acquisitions in proteomics) and without compromising the speed of acquisition. Building upon the basic method of multiplexing selected m/z ranges by their sequential injection and collective mass analysis as described in WO 2006/129083, the BoxCar method demonstrates that the dynamic range of full scans can be increased effectively by acquiring multiplexed partial scans. As each m/z window in the partial scan has the same AGC target value, the individual injection times allotted by the AGC are highly dependent on the abundances of the species contained in the windows. For instance, lower-abundant species will be assigned higher injection times than higher-abundant species, thereby reducing the proportion of highly abundant species in favor of the lower abundant ones, and better exploiting the available total ion injection time (which is not limited by the most abundant species as in standard full scans).

The idea of dividing a precursor m/z scan range into multiple m/z windows of fixed or variable width has been described in U.S. Pat. Nos. 8,809,770, 9,269,553, and 9,543,134. U.S. Pat. No. 8,809,770 uses different m/z selection windows to produce fragmentation spectra, which are searched for known compounds from a library of fragmentation spectra. U.S. Pat. Nos. 9,269,553 and 9,543,134 describe the use of multiple, wide precursor m/z selection windows covering the entire m/z range of interest to obtain multiple fragmentation spectra. However, none of these documents addresses the aspect of increasing the dynamic range of precursor ($MS^1$) scans through sequential injection and collective mass analysis of precursors. In particular, each of these documents describes $MS^2$ mass spectrometry, rather than $MS^1$ methods.

While the approaches described above have led to improvements in the acquisition of mass spectral data, it is an object of the present disclosure to provide improved methods for acquiring mass spectral data. In particular, one object of the present disclosure is to obtain high dynamic range when acquiring mass spectral data.

SUMMARY

Some embodiments of the present disclosure relate to mass spectrometry (MS) using an automatic gain control (AGC) mechanism, which determines injection times of analyte sample ions to control the number of ions entering an ion trap-based mass analyser (for example, an orbital trapping mass analyser or a trap-based time of flight (ToF), in which ions enter a trap from where they are ejected into a ToF mass analyser). The injection time is a parameter that may also be described as an "accumulation time" or a "fill time". The number of ions entering into the mass analyser of an ion trap-based mass analyser may be controlled by filling an extraction ion trap for a calculated period of time. Ions are ejected from the extraction trap into the mass analyser, such that ions can enter the mass analyser at specified times only. This calculated period of time is the injection time, accumulation time, or fill time and some embodiments of the disclosure relate to improvements in the determination of this parameter.

In some embodiments of this disclosure, automatic partitioning of the scan range may be used to separate m/z regions with high-abundance signals from those with low-abundance signals and thus allows a dynamic adjustment of the high dynamic range (HDR) windows (which are also termed m/z sub-ranges herein) according to the composition of the sample. As the method permits dynamic adjustment, the methods described herein may be particularly advantageous when the composition of a sample is highly time-dependent, which may be the case in chromatography experiments. Compared to previous methods such as the BoxCar method, an improved allocation of dynamic m/z windows can be achieved. In particular, embodiments described herein allow a dynamic focus on low-abundance regions on relatively short timescales such that automatic re-partitioning of an m/z range can in principle be performed at high frequencies, such as on a scan-to-scan basis.

In a general sense, the present disclosure provides a method for acquiring mass spectral data of a sample across at least a portion of an m/z range. The method comprises: receiving mass spectral data of the sample across the m/z range and partitioning the m/z range into one or more sets of m/z sub-ranges, each set comprising one or more m/z sub-ranges, by: dividing the m/z range into a plurality of m/z bins; determining an indication of ion abundance for each m/z bin, based on the mass spectral data; and forming an m/z sub-range of the one or more sets of m/z sub-ranges by assigning m/z bins having ion abundances that correspond to at least a threshold degree to the formed m/z sub-range. The method further comprises performing a mass analysis on the sample for each set of m/z sub-ranges, thereby acquiring one or more partial mass spectral data sets. By partitioning the m/z range in this way based on the mass spectral data, m/z sub-ranges for mass analysis can be determined dynamically. This allows multiple sets of m/z sub-ranges to be determined quickly and in a way that prevents very highly abundant species dominating less abundant species when performing mass analysis. This process of partitioning an m/z range by dividing the m/z range into bins and then grouping those bins together may be termed "clustering". The result of this "clustering" is one or more m/z bins that are grouped together, which may subsequently be processed to determine m/z sub-ranges for mass analysis.

In some embodiments, the process of forming m/z sub-ranges for mass analysis may comprise: (i) dividing a full m/z range into bins (which may be equidistant) and determining a TIC value (or other measure of ion abundance, such as an arbitrary measure of signal intensity) for each bin; (ii) grouping bins of similar TIC magnitude into clusters of varying size; and (iii) processing the list of clusters to partition the spectrum into m/z sub-ranges (m/z windows). In each iteration, the full spectral range is preferably partitioned. The final processing step (iii) may involve forming m/z sub-ranges that are wider than the clusters formed in step (ii). In some scenarios, using relatively wide overlaps between m/z sub-ranges (compared to the BoxCar method) can avoid the need to rescale intensities of peaks obtained in the flank region of a mass filter (e.g. the flanks of a quadrupole). As a consequence, it is not required to record a standard full scan concomitant with the HDR full scans in an HDR experiment. This can save time and can reduce the need for post-processing workflows.

Thus, in general terms, the disclosure also provides a method for acquiring mass spectral data of a sample across at least a portion of an m/z range, the m/z range comprising a plurality of sets of m/z sub-ranges, each set comprising one or more m/z sub-ranges. The method comprises determining a first set of m/z sub-ranges (e.g. for performing a first sub-scan) of the plurality of sets of m/z sub-ranges and determining a second set of m/z sub-ranges (e.g. for performing a second sub-scan) of the plurality of sets of m/z sub-ranges, the first set comprising (at least) a first m/z sub-range and the second set comprising (at least) a second m/z sub-range. The method further comprises mass filtering the sample to isolate ions in the first set of m/z sub-ranges using a first mass filter having a first response profile corresponding to the first m/z sub-range, the first response profile having a relatively high transmission region and one or more relatively low transmission regions, and performing mass analysis on the sample across the first set of m/z sub-ranges to obtain a first partial mass spectral data set. The first mass analysis may be described as a first sub-scan. Then, the method comprises mass filtering the sample to isolate ions in the second set of m/z sub-ranges using a second mass filter having a second response profile corresponding to the second m/z sub-range, the second response profile having a relatively high transmission region and one or more relatively low transmission regions, and performing mass analysis on the sample across the second set of m/z sub-ranges to obtain a second partial mass spectral data set. The second mass analysis may be described as a second sub-scan.

The first mass filter and the second mass filter may be the same mass filter or two distinct mass filters. For example, the first and second mass filters may be two quadrupoles or they may be a single quadrupole. However, other numbers and types of filters can be used. In preferred embodiments, a single mass filter is used and performs each sub-scan. However, in some alternative implementations, one sub-scan may be performed using one instrument, another sub-scan may be performed on another instrument, and the resulting partial spectra may be stitched together.

The step of determining the first and second sets of m/z sub-ranges comprises setting the first and second sets of m/z sub-ranges such that the relatively high transmission region of the first response profile at least partially overlaps the relatively high transmission region of the second response profile. The first and second response profiles may be adjacent to each other on the m/z axis, with a sufficiently high degree of overlap to ensure that the high transmission regions coincide. By causing the relatively high transmission regions of the response profiles to overlap, it can be assured that for any given m/z value, the obtained mass spectral data was obtained from a relatively high transmission portion of the response profile. This means that the imperfect (e.g. trapezoidal) nature of the response profile of a mass filter does not need to be compensated for, because data will have been obtained from outside the low-transmission flanks of the response profile. Thus, less post-processing of data may be required.

Each set of m/z sub-ranges may comprise one or more m/z sub-ranges. For each sub-scan across a set of m/z sub-ranges, the m/z sub-ranges may be injected sequentially. For each m/z sub-range that is injected, the mass filter is preferably tuned individually, and the mass filter will have an individual response profile associated with the particular m/z sub-range.

Moreover, an HDR scan could comprise more than two sub-scans. For instance, two, three, four or even more distinct sets of m/z sub-ranges may be identified.

Some embodiments of the present disclosure provide methods for adjusting injection times for mass spectral analysis. For example, embodiments of the disclosure allow redistribution of accumulated unused injection time among m/z windows, which can improve sensitivity in m/z regions containing ions of relatively low abundance. In particular, when an AGC algorithm determines a set of injection times that exceed the actual time available, at least some of those injection times may be reduced. This can be achieved by preferentially reducing certain injection times more than others to preserve dynamic range. For example, this can be achieved by redistributing "spare" injection time from m/z windows that are assigned injections times that are less than their fair share (e.g. an equal distribution) of injection time. However, all injection times could be reduced by an equal factor. The total available injection time may be constrained by the repetition rate of the instrument, which could be user-defined and/or based on the sample, experiment, etc. For instance, the repetition rate may depend on how frequently measurements are required across each chromatographic (e.g. liquid chromatography (LC)) peak. Thus, adjusting injection times in accordance with the methods of this disclosure can improve the utilisation of the available injection time while continuing to adhere to constraints on the available time.

Hence, in generalised terms, the present disclosure also provides a method for acquiring mass spectral data of a sample across at least a portion of an m/z range, the m/z range comprising a set of one or more m/z sub-ranges. The method comprises determining an initial distribution of injection times comprising an initial injection time for each m/z sub-range of the set of one or more m/z sub-ranges. Based on determining that a total time of the initial distribution of injection times exceeds a total available injection time for acquiring the mass spectral data, the method determines an adjusted distribution of injection times comprising an adjusted injection time for each m/z sub-range. One or more adjusted injection times in the adjusted distribution may be the same as (i.e. equal to) the corresponding initial injection times of the initial distribution. That is, not each and every m/z sub-range will have its accumulation time adjusted from its initial value. Rather, in embodiments of the disclosure, at least one injection time of the adjusted distribution differs from a corresponding injection time of the initial distribution.

The method then comprises performing mass analysis on each m/z sub-range according to the adjusted injection time distribution, so as to obtain a partial mass spectral data set. Determining the adjusted distribution of injection times comprises reducing at least one of the initial injection times for a respective m/z sub-range, such that a total time of the adjusted distribution of injection times for the set of one or more m/z sub-ranges is no greater than the total available injection time for acquiring the mass spectral data.

Partial mass spectral data sets (data obtained from separate sub-scans) can be combined to provide MS data that covers a full scan range. Hence, this disclosure also provides a scan stitching procedure, which can be used to convert two or more partial mass spectral data sets on-the-fly into an HDR full scan, which can be processed like a standard full scan by post-acquisition software tools. Therefore, additional, potentially time-consuming post-processing steps can be reduced or avoided. In the stitching procedure, two adjacent m/z sub-ranges, which originate from separate partial mass spectral data sets when obtained using the HDR approach described herein, are stitched together at their overlap region. The stitching boundary within this overlap region may be variable and can be optimised to preserve isotope distributions that occur in the border region of both windows.

The present disclosure also provides a hybrid approach. The hybrid approach involves obtaining a standard full scan of an m/z range and a single (or a small number) of HDR "zoom" scans comprising selected, non-overlapping m/z sub-ranges. The standard full scan can be used as a reference point for quantification. In some cases, the standard full scan can in itself provide adequate information for highly-abundant peaks. The HDR "zoom" scan can provide deeper insights into sparse regions of the full scan or regions of particular interest. These regions in the standard full scan could be replaced with the corresponding m/z windows from the HDR sub-scan (or sub-scans) to obtain a hybrid HDR full scan. If this hybrid HDR workflow comprises two scan events, the scan rate performance may be comparable to the approach using two HDR sub-scans.

Hence, in a general sense, the disclosure also provides a method for acquiring mass spectral data of a sample across an m/z range, comprising: performing a first mass analysis on the sample across the m/z range, thereby acquiring a first mass spectral data set; partitioning the m/z range into one or more sets of m/z sub-ranges, each set comprising one or more m/z sub-ranges; and performing a mass analysis on the sample for each set of m/z sub-ranges, thereby acquiring one or more partial mass spectral data sets.

The first mass spectral data set may therefore provide information about the sample across the whole m/z range, while the one or more partial mass spectral data sets may serve as "zoomed in" scans for particular sub-ranges of the full m/z range. The partitioning may be performed as described above, based on the first mass spectral data set. The partitioning could also be performed based on an earlier mass spectral data set (for example obtained from an earlier scan performed on the same sample). The first mass spectral data set and the one or more partial mass spectral data sets may be stitched together to provide a mass spectral data set that is effectively an enhanced version of the single full scan.

The above advantages and other advantages will become apparent from the following detailed description.

LISTING OF FIGURES

The present disclosure will now be described by way of example, with reference to the accompanying figures, in which.

DETAILED DESCRIPTION

Figure 1A:
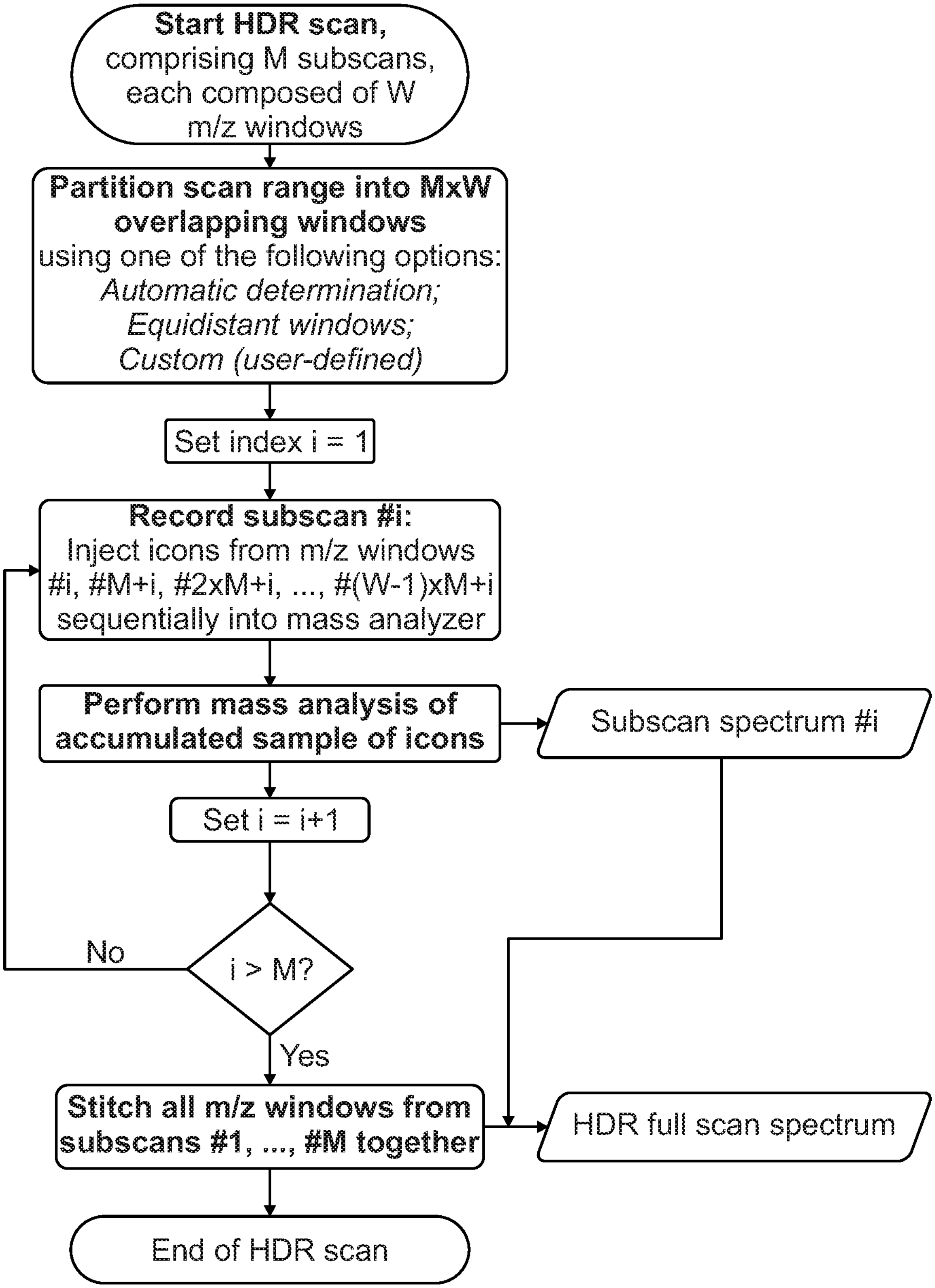
FIG. 1A shows a method for acquiring mass spectral data.

Existing approaches, such as the BoxCar method, represent basic approaches to effectively increasing the dynamic range and signal-to-noise ratio of full scans. However, known systems typically do not provide a complete online (i.e., confined to the MS instrument) workflow for producing contiguous full scan spectra, and may require post-processing software and/or calibration work prior to the actual data acquisition to obtain full scan spectra (as opposed to partial spectra). In contrast, embodiments of this disclosure can be used to implement a comprehensive online workflow capable of producing high-dynamic range full scans for a variety of applications, without the need to calibrate individually for each application. This can not only save the user time, but can also allow further online analyses of the full scans, considering algorithms that are designed to operate on full scans.

The high-dynamic range (HDR) scan methods described herein provide an improved approach to recording and processing full MS scans with an improved dynamic range, compared to standard full scans. The HDR scan processor implements algorithmic steps to (a) set up a HDR scan by analysing the full spectrum and isolating m/z regions with high signal from those with low signal, (b) fully utilise the available sample injection time by extending the AGC, and (c) stitch the HDR scan parts together, which each comprise a subset of the isolated m/z regions. The resulting scan is an HDR full scan spectrum that can be used as a replacement for standard full scans. The methods described herein are compatible with established mass spectrometry systems and workflows, reducing the need for additional pre-processing calibration steps and post-processing rescaling or stitching steps.

A scenario in which the HDR methods described herein are especially advantageous is in experiments with low sample loads, in particular single-cell proteomics. A known set of the most abundant 1000-3000 proteins could be entirely analysed by HDR scans only, without requiring any dedicated $MS^2$ scans of isolated precursors. An All Ion Fragmentation scan after every full scan may be adequate to gain further information about the sample constituents.

Apart from the increased dynamic range, HDR full scans also allow a better prediction of injection times for $MS^2$ scans compared to standard full scans. The reason is that, in a standard full scan the ion optical settings (such as RF amplitude of the S-lens or ion funnel) are tuned towards the lower end of the spectral m/z range, which potentially lowers the transmission of ions in higher-m/z regions. By contrast, in an $MS^2$ scan of an isolated precursor from a higher-m/z region, the transmission of the precursor is likely to be higher due to the much narrower isolated m/z range. Therefore, when the AGC predicts the injection time for a precursor in a narrow m/z window based on a standard full scan, the resulting injection time may be too high due to an underestimation of the TIC, and the actual TIC in the $MS^2$ scan may overshoot the desired AGC target accordingly. With HDR scans, however, the ion optical settings (e.g. RF etc.) may be set individually for each window (each m/z sub-range), which reduces the transmission difference between full scans and $MS^2$ scans and consequently improves the performance of the AGC.

Hence, the present disclosure also provides a method of controlling AGC injection times in an $MS^2$ scan based on an $MS^1$ scan, in which ion optics settings are varied across the m/z range. The HDR method can provide improved AGC prediction accuracy, because an $MS^1$ scan may be performed by a combination of few injections with smaller mass windows, which reduces differences in ion optics settings when compared with SIM or $MS^2$ scans, when usually narrow mass windows are selected. For instance, the method may be described in general terms as a method for acquiring $MS^2$ mass spectral data of a sample across at least a portion of an m/z range, comprising: performing one or more first mass analyses on the sample for each m/z sub-range of a set of m/z sub-ranges, thereby acquiring one or more partial mass spectral data sets, wherein each first mass analysis is a $MS^1$ mass analysis performed with ion optics set for each m/z sub-range of the respective set of m/z sub-ranges; and performing a second mass analysis on the sample for each m/z sub-range of a $MS^2$ set of m/z sub-ranges, wherein the second mass analysis is a $MS^2$ mass analysis performed with ion optics set for each m/z sub-range of the $MS^2$ set of m/z sub-ranges. The $MS^2$ set of m/z sub-ranges may be determined based on the one or more partial mass spectral data sets. The first mass analysis may be an HDR scan as described herein.

With regard to the usage of multiple precursor m/z windows, known methods (such as those described in U.S. Pat. Nos. 8,809,770, 9,269,553, and 9,543,134) employ selection m/z windows to enhance fragmentation ($MS^2$) scans and associated data-independent workflows, whereas some (but not all) embodiments of the present disclosure aim at improving precursor ($MS^1$) scans. The HDR methods described herein generally do not require any assumptions about fragmentation scans of selected precursors. Rather, the HDR methods described herein can be used in conjunction with common "Top N" data-dependent experiments, in which precursors are selected from precursor survey scans and fragmented to obtain product ion spectra.

More specifically, existing solutions have the following limitations:

Partitioning of the scan range: The m/z windows or sub-ranges that are multiplexed in the "BoxCar" method are often fixed and have to be determined/optimised beforehand for the specific sample or application (e.g., proteomics in F. Meier et al.), depending on the typical distribution of species across the m/z range of interest. Also, a fixed set of windows, even when optimised for the given application type, may not always be optimal during an acquisition involving chromatography, in which the composition of the injected sample naturally changes over time. Moreover, while WO-2018/134346 makes reference to data-dependent partitioning, it is explained that partitioning is effected such that highly abundant species become assigned to regions that are narrow on the m/z axis. However, this approach may not reflect realistic distributions of peaks within many samples. Thus, the automatic partitioning algorithm described herein provides more flexibility and is more generally applicable. In particular, since WO-2018/134346 focuses solely on "highly abundant species" being assigned to "regions which are narrow on the m/z axis", the method disclosed therein is effectively restricted to samples with few highly abundant species present in well-defined, narrow m/z regions that are clearly separated from the low-abundant rest. However, this is unlikely to reflect the practical reality of most samples: the injection time is determined based on the overall TIC of a window (summed intensity of the contained signals), not only by the most prominent signals. Thus, larger windows with low-abundant signals can have longer injection times than smaller windows with highly abundant species. The present disclosure can take this into account in the partitioning procedure. Moreover, WO-2018/134346 implies that the partitioning is based on a binary decision between "low" and "high" abundance of a species, but this is an extreme case. Typically, a broad range of abundances is observed, and signals of varying intensities frequently overlap across given m/z windows. Thus, it is rarely likely to be possible (or only for certain applications) to tailor a window such that the abundant species is "practically the only species present". In contrast, the disclosure provides a broadly applicable technique that can automatically (without user intervention or prior knowledge) partition a given spectrum based on its ion abundance distribution.

Stitching of m/z windows: The ions from m/z windows are typically isolated by a quadrupole, the transmission profile of which has a trapezoidal shape, rather than an ideal boxcar shape. The widths of the trapezoid flanks typically increase with the isolation width. As a consequence, the intensities of ions detected at the rising and falling edges of the trapezoid need to be corrected to avoid distorting the relative abundances, and the correction function either has to be determined beforehand for the selected set of windows, or has to be derived from a comparison between the peak intensities in the multiplexed HDR scan and those in a standard full scan in a post-processing analysis. The first option would only be applicable with a fixed set of m/z windows and requires a dedicated calibration procedure, whereas the latter option requires the acquisition of a standard full scan at regular intervals during the analysis, which may further slow the experiment. In contrast, embodiments described herein can reduce the need for further scans or calibrations.

Determination of injection times by the AGC: In known implementations of AGC on, for example, Exactive™ and Exploris™ instruments, each multiplexed m/z window can be assigned an individual maximum injection time (termed max. IT). For an easy replacement of standard full scans with HDR full scans without exposing further parameters in the user interface, the max. IT specified by the user for the scan could be distributed evenly to the m/z windows. However, since windows with a higher TIC may be assigned injection times below the upper limit given by their max. IT allotment, the overall max. IT for the entire scan may not be exploited to the full extent. For example, with an overall max. IT of 100 ms and 10 m/z windows, each window is assigned an individual max. IT of 10 ms. If the AGC determines an injection time of only 1 ms for a high-TIC window, the remaining 9 ms could be utilised by other, lower-TIC windows, for there is a greater need to fully exploit the available injection time to compensate for their low TIC. If half of the windows use only 5 ms, the unused time further accumulates to 25 ms. Therefore, in some embodiments, if it is determined that the total IT needed for multiple m/z sub-ranges exceeds the total IT available, then the IT of at least one m/z sub-range may be reduced, to bring the total IT within the limit. In some embodiments, "spare" injection time can be distributed from sub-ranges having injection times that are less than an equal allocation.

To address the limitations of the existing solutions as outlined above and thus create a holistic HDR scan workflow, the disclosure proposes various extensions to the original "BoxCar" method. In FIG. 1A, a flowchart illustrating the general concept of performing HDR scans is shown. In particular, FIG. 1A shows the basic workflow of a high-dynamic range (HDR) scan. The sequence of recording of sub-scans step (#i, #M+i, #2×M+i, . . . ) is similar to the BoxCar sequence shown in FIG. 1A of WO-2018/134346.

Automatic Partitioning of the Scan Range

Embodiments of the present disclosure partition the scan range of interest into multiple m/z sub-ranges automatically based on the TIC distribution across the full m/z range, which allows choosing m/z sub-ranges of variable position and width, and adapting these m/z sub-ranges dynamically to the time-dependent composition of the sample. This disclosure provides an algorithm that partitions a given m/z range into a set of m/z sub-ranges, which are usually overlapping, and which can then be used to inject the ions from these m/z sub-ranges sequentially in two or more multiplexed sub-scans (partial scans), as illustrated in FIG. 1A. The HDR algorithm accepts the following input parameters:

TABLE 1

| Parameter | Symbol/variable name |
|---|---|
| Scan range, defined by first mass (FM) and last mass (LM) | FM, LM |
| Desired total number of m/z sub-ranges, into which the scan range is to be partitioned (N equals the product of the number of sub-scans (termed M in FIG. 1A) and the number of sub-ranges per sub-scan (termed W in FIG. 1A, so N = M × W)) | N |
| Minimum width of m/z sub-ranges | min_width |
| Desired overlap between adjacent sub-ranges, given by an absolute m/z offset and a factor to be multiplied with the sub-range width | overlap_offset, overlap_factor |
| Width of the low-transmission flanks of the transmission trapezoid of the quadrupole, given by an absolute m/z offset and a factor to be multiplied with the sub-range width (including overlaps) | lt_offset, lt factor |

The algorithm provides a method for acquiring mass spectral data of a sample across at least a portion of an m/z range. The method starts by receiving mass spectral data of the sample across the m/z range. First, the algorithm divides the (full scan range) mass spectrum (FM to LM) into m/z bins of size min_width/2 and calculates the TIC as the sum of peak intensities for each bin. Starting with the highest-TIC bin and proceeding in descending order of TIC values, adjacent bins with TICs of similar magnitude are clustered together. The aim of the partitioning procedure is to isolate high-intensity from low-intensity regions, so that more (injection) time can be spent to elucidate low-intensity regions. Hence, in general terms, the method partitions the m/z range into one or more sets of m/z sub-ranges, each set comprising one or more m/z sub-ranges. The partitioning is effected by: dividing the m/z range into a plurality of m/z bins; determining an indication of ion abundance for each m/z bin, based on the mass spectral data; and forming an m/z sub-range of the one or more sets of m/z sub-ranges by assigning m/z bins having ion abundances that correspond to at least a threshold degree to the formed m/z sub-range.

In particular, partitioning the m/z range may comprise: (i) identifying an initial m/z bin (e.g. having the highest ion abundance) of the plurality of m/z bins; (ii) determining that one or more m/z bins adjacent (directly adjacent, or optionally with one or more intervening bins that are not directly adjacent) to the initial m/z bin have ion abundances that correspond to the ion abundance of the initial m/z bin to at least a threshold degree; and (iii) assigning the initial m/z bin and the one or more m/z bins adjacent to the initial m/z bin to the formed m/z sub-range.

This process may form a cluster of m/z bins that have corresponding ion abundances. Once this is complete for a first cluster, the process may be iterated on the remainder of the m/z range to form a plurality of different clusters. The plurality of different clusters may be stored as a list L of clusters. Thus, the method may further comprise forming a complement of the formed m/z sub-range. The complement of the formed m/z sub-range is the set of m/z values of the full m/z range that excludes the formed m/z sub-range. That is, if the m/z range spans from $m/z_1$ to $m/z_4$ and the formed m/z sub-range spans from $m/z_2$ to $m/z_3$, where $m/z_4>m/z_3>m/z_2>m/z_1$, then the complement of the formed m/z sub-range consists of the set of m/z values spanning from $m/z_1$ to $m/z_2$ and the set of m/z values spanning from $m/z_3$ to $m/z_4$, but the complement does not contain the set of m/z values spanning from $m/z_2$ to $m/z_3$. Steps (i), (ii) and (iii) may be repeated on the complement of the formed m/z sub-range, thereby forming a further m/z sub-range of the one or more sets of m/z sub-ranges. This can be repeated by iteratively forming a complement of the formed m/z range and repeating steps (i), (ii) and (iii) on each successive complement of the formed m/z sub-range, thereby forming a plurality of further m/z sub-ranges of the one or more sets of m/z sub-ranges.

In the algorithm, a threshold T of half of the TIC of the currently processed bin is used (T=0.5×start_tic), meaning that all the adjacent bins having a TIC be added to the cluster. That is, there may be a threshold degree of correspondence between m/z bins, which is a predefined ratio of an ion abundance (which could be inferred from, for example, total ion current) of a less abundant m/z bin to an ion abundance of a more abundant m/z bin. This predefined ratio is preferably at least 0.5, to ensure an acceptable degree of correspondence is obtained.

Moreover, single bins that do not exceed T but lie between two compatible bins are also added to the cluster in order to avoid an over-partitioning of the spectrum into sub-ranges that do not meet the minimum width requirement. In particular, the methods described herein may advantageously comprise determining that a first m/z bin and a second m/z bin have ion abundances that correspond to at least a threshold degree; determining that a third m/z bin between (e.g. directly between) the first m/z bin and the second m/z bin has an ion abundance that does not correspond with the ion abundances of first and second m/z bins to at least the threshold degree; and assigning the first, second and third m/z bins to a single m/z sub-range.

The reason for using the half width instead of the full minimum width min_width for the bin size is that the half width increases the flexibility with respect to the clustering step, since bins of similar TIC magnitude on either side of the currently processed bin can be added to the cluster to reach the minimum width. If a cluster does not reach the minimum width (i.e., comprises only one bin), it is expanded symmetrically by min_width/4 on either side, or asymmetrically by using the intensity-weighted m/z centroid of the bin and expanding by a total of min_width/4.

Other bin sizes (min_width/N, N=integer≥1) could also be used. The integer of 2 is preferred to provide more flexibility when clustering adjacent bins together (i.e., joining adjacent bins on the left or right side) while at the same time preventing over-partitioning of the spectrum, which would result in many windows that do not meet the min_width requirement. Each of the plurality of m/z bins may have a width that is configurable by a user; and/or each of the plurality of m/z bins has a width that is half of a predefined (e.g. by a user) minimum width.

Figure 1B:
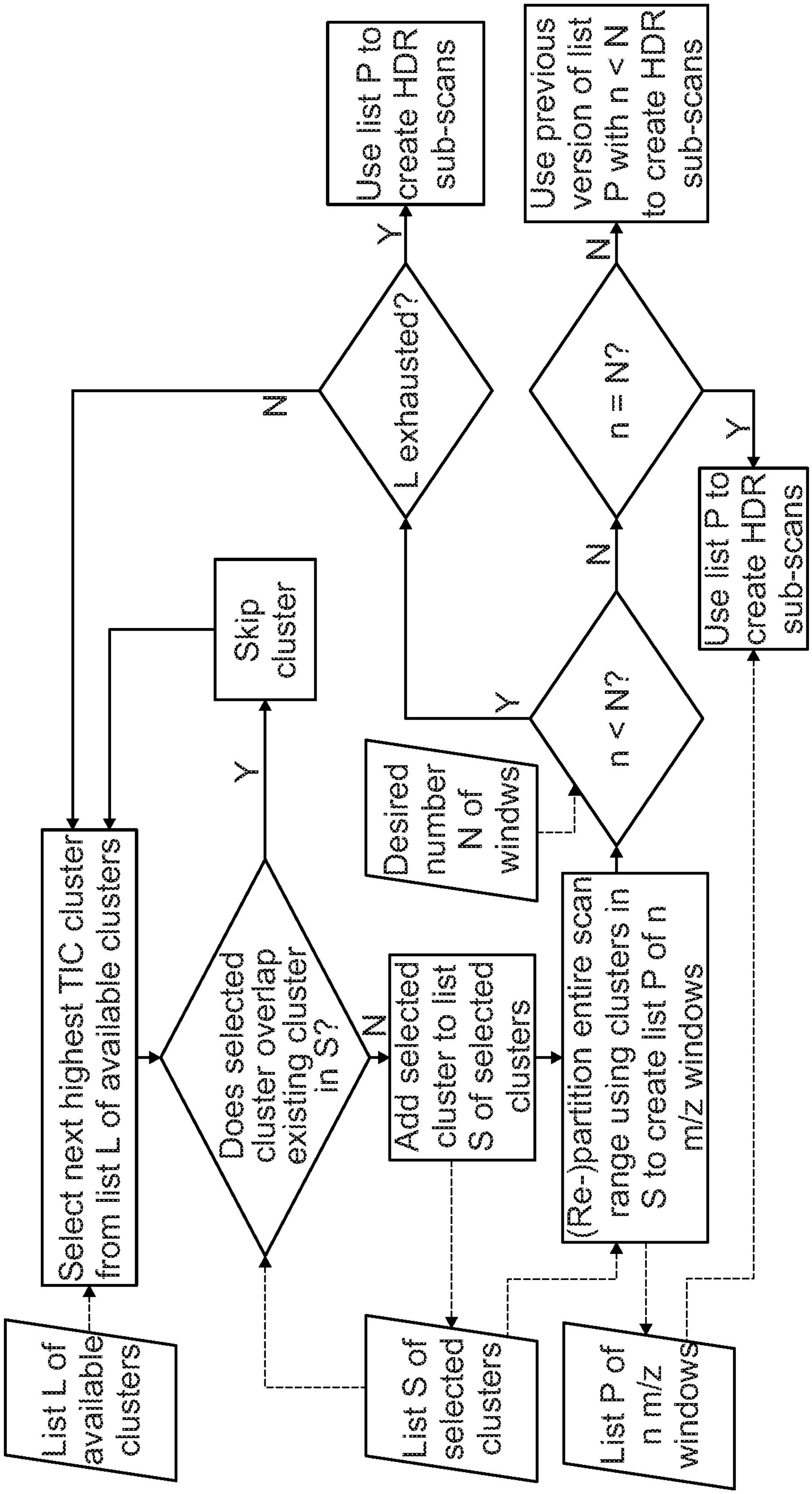
FIG. 1B shows a method for partitioning a scan range.
Figure 2:
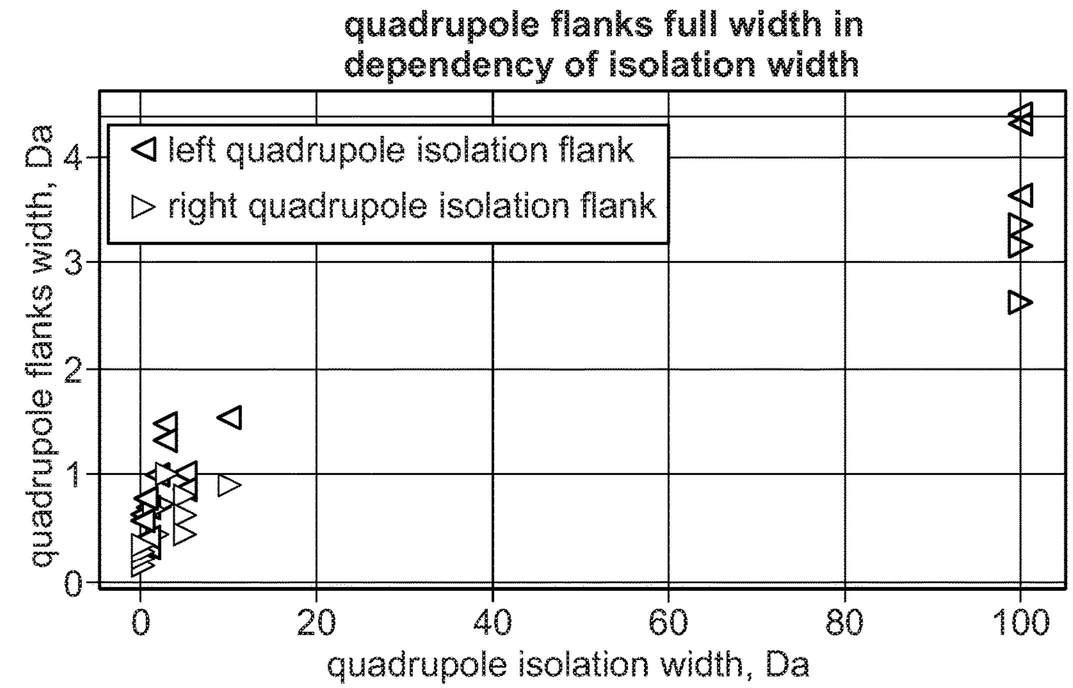
FIG. 2 shows the relationship between the widths of quadrupole transmission flanks and isolation widths.

FIG. 1B shows how a set of clusters can be processed. Starting with the highest-TIC cluster and proceeding in descending order of TIC values, the plurality of available clusters in the list L are used to partition the (full) scan range into multiple m/z sub-ranges, primarily aiming at separating high-TIC m/z regions from those in which the signal is sparse. When selecting TIC clusters and calculating the partitioned scan range, selected clusters are stored in a list S, and a set of partitioned m/z sub-ranges that cover the entire scan range are stored in a list P. In each iteration, a new cluster from the list L that does not overlap with the existing clusters in S is selected from L and added to S. The clusters in S are processed iteratively, in ascending order of m/z, to (re-)partition the scan range. Consequently, every time S is extended by a new cluster, the list P of m/z sub-ranges is generated anew.

In each iteration, a cluster adds at least one and at most three sub-ranges (including the cluster itself) to P: If the cluster is tangent to one or two existing boundaries, i.e., it starts and/or ends at an existing sub-range in P or at FM or LM, one (if tangent to two boundaries) or two (if tangent to one boundary) sub-range(s) are added to P. If the cluster is not tangent to an existing boundary, three sub-ranges are added, because two complement windows along with the cluster itself are required to cover the full m/z scan range.

That is, having built a list L of clusters (based on the TIC of m/z bins, as described previously), the algorithm selects the highest TIC cluster from L and adds this to a list of selected clusters S (which in the first iteration will only include one cluster). Then, a step of (re-)partitioning is performed using only the clusters in S (i.e. at first only one cluster, although further clusters will be included in subsequent iterations), by processing the clusters in ascending order of m/z, to produce a partitioned scan range P. According to the principle that in each iteration, a cluster adds at least one and at most three sub-ranges (the maximum of three sub-ranges can be added only once), then if the single cluster is somewhere in the middle of the scan range (i.e. the cluster does not coincide with the upper or lower limit of the full scan range), the first version of P will include three m/z windows, i.e. n=3.

Then, if more than 3 windows are desired (n<N), the process is re-iterated, by selecting the next highest TIC cluster from L that does not overlap with any clusters in S and adding that cluster to the list of selected clusters S (which will now include 2 clusters). Then, the (re-)partitioning step is performed again from scratch (i.e. P from the previous iteration is discarded) to create a new version of P. According to the above rules, now there could be a maximum of five m/z windows in P (i.e. n=5), or there may be fewer if the 2 clusters in S are tangent to one another or to a boundary of the scan range. This entire process is reiterated until n=N, or until n>N (in which case a previous version of P is used that gives n</V). Hence, the available clusters are processed until the desired number of sub-ranges N has been reached in P. If N cannot be reached exactly, then the best solution that does not exceed N is selected (i.e. by using a previous version of P). That is, the method may comprise repeatedly forming m/z sub-ranges until a total number of formed m/z sub-ranges is no greater than a predefined total number (N, which could be fixed, user-defined, or which could vary dynamically) of m/z sub-ranges in the one or more sets of m/z sub-ranges. The m/z sub-ranges contained in P are then used to set up the HDR sub-scans. Further criteria may be applied beyond those shown in FIG. 1B. For example, one criterion that is not shown in FIG. 1B, and which may be applied subsequent to the partitioning procedure, is the following: the number of windows n must be equal to or higher than the number of HDR sub-scans (otherwise, the HDR acquisition cannot be conducted). If this criterion is not satisfied, then the partitioning procedure can be repeated, for example, with an increased threshold for clustering m/z bins of similar TIC magnitude (e.g., increasing the threshold from 0.5 to 0.75 or 0.9), thereby trying to enforce a higher number of separate clusters.

The m/z sub-ranges in the lists L, S and P (which are used to partition the m/z range) are sometimes referred to as preliminary sub-ranges. Any m/z sub-range that is used in the process of partitioning the full m/z range may be described as a preliminary m/z sub-range. The preliminary sub-ranges may in some cases be identical to the final m/z sub-ranges. However, in some cases preliminary m/z sub-ranges may be determined based on the above algorithm, and then the preliminary m/z sub-ranges may be adjusted prior to forming the final sets of m/z sub-ranges that will be used for mass analysis.

As mentioned above, in the partitioning procedures described herein, up to three m/z sub-ranges can be formed from a single cluster of m/z bins. In generalised terms, forming one or more m/z sub-ranges of the one or more sets of m/z sub-ranges based on a respective preliminary m/z sub-range (e.g. a sub-range in the list S) may comprise: assigning the respective preliminary m/z sub-range to the one or more sets of m/z sub-ranges; and assigning, to the one or more sets of m/z sub-ranges, one or two m/z sub-ranges adjacent to (e.g. bordering on either side) the respective preliminary m/z sub-range, wherein each of the one or two m/z sub-ranges adjacent to the respective preliminary m/z sub-range extends from one end of the respective preliminary m/z sub-range to an end of a further preliminary m/z sub-range. This process can be used to provide a list of m/z sub-ranges that span the m/z range while separating high abundance regions from low abundance regions. Preferably the method further comprises increasing the width of at least one of the one of the one or two m/z sub-ranges adjacent to the respective preliminary m/z sub-range.

This can ensure that overlapping m/z sub-ranges are obtained, as discussed in further detail below.

In the partitioning process, the m/z sub-range sizes are preferably automatically adjusted to account for the desired sub-range overlap, which is generally calculated by the linear relationship overlap_offset+overlap_factor×window_width. In essence, initially, clusters that do not overlap are formed, and this step then determines a desired degree of overlap for the non-overlapping clusters found in the previous step. When an m/z sub-range is added to the list, the algorithm decides whether the current m/z sub-range or the previous m/z sub-range (i.e., the adjacent m/z sub-range on the left side) is adjusted:

- If both sub-ranges have the same size, the sub-range with the higher TIC is adjusted (either by decreasing the lower boundary of the current sub-range or by increasing the upper boundary of the previous sub-range).
- If the current sub-range is larger than the previous one, the upper boundary of the previous sub-range is adjusted (increased), using the overlap calculated for the current sub-range.
- If the previous sub-range is larger than the current one, the lower boundary of the current sub-range is adjusted (decreased), using the overlap calculated for the previous sub-range.

The partitioning process may be described as initially comprising the steps of: assigning m/z bins having ion abundances that correspond to at least a threshold degree to a first preliminary m/z sub-range (e.g., an initial cluster) and assigning m/z bins having ion abundances that correspond to at least a threshold degree to a second preliminary m/z sub-range (e.g., a second cluster). The method may then comprise determining that the first preliminary m/z sub-range overlaps with the second preliminary m/z sub-range, and discarding the second preliminary m/z sub-range without assigning the respective m/z bins to an m/z sub-range of the one or more sets of m/z sub-ranges. This ensures that non-overlapping preliminary m/z sub-ranges are obtained. These non-overlapping preliminary m/z sub-ranges can then be processed as described above to obtain a desired degree of overlap.

The methods of the present disclosure may comprise assigning an initial m/z bin and one or more m/z bins adjacent to the initial m/z bin to form a first preliminary m/z sub-range. Forming the m/z sub-range may comprise at least one of: forming an m/z sub-range by increasing the width of the first preliminary m/z sub-range; and/or forming an m/z sub-range by increasing the width of a second preliminary m/z sub-range adjacent to the first preliminary m/z sub-range. This procedure can ensure that overlapping windows are formed from windows that are initially non-overlapping.

The methods may comprise determining that the first preliminary m/z sub-range and the second preliminary m/z sub-range adjacent to the first preliminary m/z sub-range have the same width; determining which of the first preliminary m/z sub-range and the second preliminary m/z sub-range is associated with a higher ion abundance (e.g. based on TIC); and increasing the width of the one of the first preliminary m/z sub-range and the second preliminary m/z sub-range sub-range that is associated with the higher ion abundance. Increasing the width of at least one of the preliminary m/z sub-ranges can be performed to cause the formed m/z sub-ranges to at least partially overlap. For instance, due to the way in which m/z sub-ranges are distributed between the different sets of m/z sub-ranges, one m/z sub-range in a first set of m/z sub-ranges may at least partially overlap another m/z sub-range in a different set of m/z sub-ranges.

The methods of the present disclosure may further comprise, based on determining that the first preliminary m/z sub-range is wider than the second preliminary m/z sub-range, increasing the width of the second preliminary m/z sub-range. Alternatively, based on determining that the first preliminary m/z sub-range is narrower than the second preliminary m/z sub-range, the width of the preliminary m/z sub-range may be increased. This can help to ensure that the formed sub-ranges have widths that allow for effective acquisition of mass spectral data.

Forming an m/z sub-range of the one or more sets of m/z sub-ranges may comprise: forming one or more preliminary m/z sub-ranges by assigning m/z bins having ion abundances that correspond to at least a threshold degree to a respective preliminary m/z sub-range; and forming one or more m/z sub-ranges of the one or more sets of m/z sub-ranges based on a respective preliminary m/z sub-range. The preliminary m/z sub-ranges may also be described as clusters of m/z bins. In this way, clusters of m/z bins that have similar ion abundances can be formed and subsequently used to form m/z sub-ranges.

In any event, the first and second preliminary m/z sub-ranges may advantageously overlap by an amount that: includes an offset that is proportional to the width of the first or second preliminary m/z sub-range; and/or includes a constant offset. For instance, the linear relationship overlap_offset+overlap_factor×window_width could be used, or some variant of this relationship could also be used.

Considering a pair of adjacent sub-ranges, another option would be to always adjust the size of the higher-TIC sub-range, independent of the actual sub-range widths, in order to ensure that the lower-TIC sub-range does not include any high-intensity signals from the overlap region shared with the higher-TIC sub-range, which would reduce the dynamic range. However, as the overlap increases with the sub-range width, the resulting overlap for wide high-TIC sub-ranges may exceed the width of an adjacent, narrower low-TIC sub-range and even overlap with the sub-range after next. This would run contrary to the concept of using non-overlapping sub-ranges in each HDR sub-scan. Overlapping m/z sub-ranges in a single scan should be avoided, because the overlapping regions are then injected twice into the analyser, which distorts the peak intensities and complicates signal processing. As the overlap width depends on the window size (if overlap_factor>0), the overlap calculated for a large window may actually exceed the width of an adjacent, smaller window, and even extend into the window after next, which would complicate the HDR workflow. For example, considering windows ABCD, with the overlap for A extending into C, the sub-scan covering A and C would not satisfy the requirement of non-overlapping windows.

Moreover, high-TIC sub-ranges are usually narrower than low-TIC sub-ranges. Therefore, the adjustment based on the size as outlined above is usually consistent with the aim of preserving the dynamic range for the lower-TIC sub-ranges.

When characterising a transmission profile of a filter, a threshold of 95% may be appropriate to define a high transmission region. Other ways of characterising the response profile can be used. For instance, a relatively high transmission region of a first response profile and/or a second response profile may be a region having at least 90% transmission of ions, at least 95% transmission of ions or at least 99% transmission of ions.

In practice, the flank parameters can be determined by first recording a set of transmission profiles across a given m/z range and using multiple isolation widths, and then fitting trapezoid functions to the raw data. This can be used to directly yield the flank widths, without applying a predefined high transmission threshold. In any event, each response profile is preferably substantially trapezoidal and may have a relatively high transmission region between a plurality of relatively low transmission regions (e.g. two low transmission flows either side of a high transmission region). For example, determining first and second sets of m/z sub-ranges may comprise: determining a first trapezoidal fit of a first response profile and a second trapezoidal fit of a second response profile based on mass spectral data obtained using the first mass filter and the second mass filter; and determining a relatively high transmission region of the first response profile and a relatively high transmission region of the second response profile based on the first and second trapezoidal fits.

Once the exact m/z boundaries of a sub-range, including all overlaps, and thus the final sub-range widths are known, the width of the low-transmission flanks can be calculated as It_width=It_offset+It_factor×final_window_width. These parameters can readily be determined in advance for the quadrupole model employed in the instrument and then hard-coded in software. If the individual (sample-to-sample) variation of these parameters is too high, though, they may also be calibrated individually for every instrument (either during manufacture or during the regular system calibration run by the customer).

In order to avoid the need to rescale the intensities of the peaks located in the quadrupole low-transmission flanks, the sub-range overlap should be significantly larger than the flank region. Then, in the stitching procedure, the peaks in the flank region of a sub-range can be taken from the corresponding high-transmission region of the adjacent sub-range. For example, the overlap parameters (offset and factor) could be 5 Th and 15%, and the low-transmission parameters could be 1 Th and 4%. This would result in an overlap of 20 Th and a low-transmission width of 5Th for a sub-range size of 100 Th. An example of quadrupole flank widths is shown in FIG. 1A, which can be described by parameters It_offset 1 Da and It_factor 4% with good quality. In particular, FIG. 1A shows widths of quadrupole isolation profile flanks in dependency of isolation sub-range width.

As indicated by the expression It_width=It_offset+It_factor×final_window_width, determining first and second sets of m/z sub-ranges may comprise determining a degree of overlap for first and second response profiles based on a width of at least one of the first and/or the second response profiles. For instance, the width of a relatively low transmission region may be taken into account. Using the fact that the widths of trapezoidal flanks typically increase with the isolation width to set the degree of overlap may ensure that data from a high transmission region of the response profile are always available. In particular, the relatively high transmission region of the first response profile preferably overlaps the relatively high transmission region of the second response profile by an amount that is greater than: a width of a relatively low transmission region of the first response profile; and/or a width of a relatively low transmission region of the second response profile.

The automatic partitioning of the m/z scan range as described above can be performed once at the beginning of a sample analysis, for example when the sample composition does not change significantly over the course of the analysis. Alternatively, the partitioning can be performed at regular intervals during analysis, depending on how fast the sample composition changes over time. It is also possible to perform the procedure after every HDR scan.

For instance, the methods may comprise partitioning the m/z range into a plurality of first sets of m/z sub-ranges, each first set comprising one or more m/z sub-ranges; performing a first mass analysis on the sample for each first set of m/z sub-ranges, thereby acquiring a plurality of first partial mass spectral data sets; partitioning, based on ion abundances indicated by the plurality of first partial mass spectral data sets, the m/z range into a plurality of second sets of m/z sub-ranges, each second set comprising one or more m/z sub-ranges; and performing a second mass analysis on the sample for each second set of m/z sub-ranges, thereby acquiring a plurality of second partial mass spectral data sets. The automatic partitioning can be repeated as many times as needed during an experiment. For example, if a sample has a time-dependent composition, then the partitioning performed at one time might not be optimal for the sample after a certain period of time has elapsed. Therefore, the partitioning methods of the present disclosure can be repeated at a plurality of different times based on ion abundances of previous scans.

In embodiments of this disclosure, there may be a step of performing a preliminary mass analysis (e.g. a standard full MS 1 scan, although a BoxCar type scan could also be a preliminary scan) on the sample across the m/z range to obtain a preliminary mass spectral data set. The step of partitioning the m/z range into the plurality of first sets of m/z sub-ranges may be performed based on ion abundances indicated by the preliminary mass spectral data set. The methods of the disclosure may repeatedly partition the m/z range into a plurality of further sets of m/z sub-ranges, each further set of m/z sub-ranges being determined based on ion abundances indicated by at least one previously-obtained partial mass spectral data set. Further mass analysis on the sample may be performed for each further set of m/z sub-ranges, thereby acquiring a plurality of further partial mass spectral data sets. Thus, the partitioning can be performed repeatedly based on a time-dependent composition of a sample. At least one and preferably each mass analysis may be a $MS^1$ mass analysis. A combination of $MS^1$ and $MS^2$ or $MS^N$ analyses can also be used.

As shown in FIG. 1A, partitioning the m/z range into one or more sets of m/z sub-ranges comprises preferably comprises forming M sets of m/z sub-ranges each comprising W m/z sub-ranges. In this implementation, the m/z sub-ranges are numbered in order of m/z (e.g. in increasing order of m/z, although they could also be in order of decreasing m/z). The i-th set of m/z sub-ranges comprises m/z sub-range numbers i, M+i, 2M+i, . . . , (W−1)M+i, for each value of i=1, . . . , M. This way of distributing m/z sub-ranges to sub-scans helps to ensure that high dynamic ranges are achievable across the full m/z range. It will be appreciated that the total number of m/z sub-ranges may not be exactly divisible by M and W. For example, if M=3 and W=3 (i.e. M×W=9) but 10 sub-ranges are desired, then one set of m/z sub-ranges may comprise an additional (i.e. 4) m/z sub-ranges. In such cases where the total number of sub-ranges is not divisible by M and/or W, the same scheme (i.e. i, M+i, 2M+i, . . . , (W−1)M+i,) for distributing the m/z sub-ranges to the different sets may be used, with the simple addition of further m/z sub-range(s) to (at least) one set.

In some embodiments, m/z sub-ranges may be distributed to sub-scans such that, for example, each sub-scan gets a roughly equal share of low- and high-intensity m/z sub-ranges.

In some alternative examples, each m/z sub-range in a respective set may have an ion abundance that corresponds to the ion abundance of the formed m/z sub-range to at least a threshold degree. This may mean that a sub-scan performed on a respective set of m/z sub-ranges is unlikely to be performed on a mixture of very high and very low abundance ions. For instance, partitioning the m/z range may comprise any one or more of: assigning one or more m/z sub-ranges associated with a relatively high ion abundance in the sample to a first set of m/z sub-ranges of the one or more sets of m/z sub-ranges; and/or assigning one or more m/z sub-ranges associated with a relatively low ion abundance in the sample to a second set of m/z sub-ranges of the one or more sets of m/z sub-ranges; and/or assigning one or more m/z sub-ranges associated with an intermediate ion abundance in the sample to a third set of m/z sub-ranges of the one or more sets of m/z sub-ranges.

Each set of m/z sub-ranges may comprise m/z sub-ranges having ion abundances that correspond to at least a threshold degree (e.g. some predefined percentage), which may be indicated by a preliminary mass spectral data set such as a pre-scan, or a previous HDR scan.

Equidistant Sub-Ranges

As an alternative to the automatic partitioning, the scan range from FM to LM can be partitioned into N equidistant sub-ranges (also termed windows). The sub-range or window width is calculated by $$\text{window\_width} = \max\left(\text{min\_width}, \frac{LM - \text{FM} + (N-1) * \text{overlap\_offset}}{N + \text{overlap\_factor} * (1-N)}\right)$$

The size of the sub-range overlap is given by overlap_size=overlap_offset+overlap_factor× window_width. Taking the overlap into account, the lower boundaries of the m/z sub-ranges are given by FM+(i−1)× (window_size−overlap_size), with i being the sub-range index (i=1 . . . N).

Custom Sub-Ranges

As the composition of the sample injected to the MS and thus the valuable mass range typically changes over time during a proteomics experiment that is supported by chromatography, it can be advantageous to allow a user to define multiple time-dependent sets of m/z sub-ranges, or define an "m/z gradient" if the m/z regions of interest change in a linear fashion. The instrument could then select the set of sub-ranges based on the retention time (RT) of the experiment.

Another application of custom sub-ranges is when there may be strict requirements for the quantitation of results from one LC run to another, e.g. for label-free quantitation. In such cases, allowing the instrument to adjust sub-ranges dynamically can create a discrepancy in peak intensity comparison between two LC runs of the same study. This is because different m/z sub-ranges settings, created dynamically, can alter ion intensity and introduce intensity variation, caused by the HDR method (i.e. simply by instrument), but not by chemical/biological difference between samples, analysed in two LC runs. To avoid this effect, first reference LC-run(s), based on single sample or mix of samples, can be done fully dynamically (as described above in relation to automatic partitioning), to optimise the HDR/LC/MS method. After that, for all measurements, a fixed set of custom m/z sub-ranges and LC retention times can be used for all further runs, when the actual sample of interest is measured.

Thus, some embodiments comprise receiving a sample from a chromatograph, such as a liquid chromatograph or a gas chromatograph. The methods may comprise repeating the methods described herein (e.g. the partitioning and scanning) one or more times on one or more samples obtained from the chromatograph to obtain time-dependent mass spectral data for the sample.

Combination of Custom, Equidistant and/or Automatic Partitioning of Sub-Ranges

Any of the two or all three m/z-sub-ranges partitioning methods can be used simultaneously in one LC-run. For example, based on a priori knowledge about the sample, or knowledge gained during HDR/LC/MS method optimisation, custom sub-ranges can be applied to cover the desired m/z and/or RT ranges. But beyond these known ranges, measurements can still be done in automatic-partitioning mode. This way, a combination of custom and automatic-partitioning sub-range algorithms in one LC/MS scan and even in some of MS scans is obtained. Practically, it can ensure, that measurements generate data for peaks of interest (target mode) and, at the same time, improves the overall dynamic range of the measurements, which can be of interest for standard data processing or for retrospective analysis later.

Worked Examples of Automatic Partitioning

As described previously, HDR scans partition a scan range into a set of overlapping m/z windows or sub-ranges, before measuring at least 2 sub-sets of non-overlapping windows to obtain at least 2 separate sub-scans, and stitching the sub-scans together to obtain an HDR full scan. With regard to distributing the m/z windows to the sub-scans, one may consider, for example, a scan range that has been partitioned into 12 m/z windows (denoted A-L) of any size, and how these windows would be distributed to the available sub-scans (2 or 3 in the following example):

Windows: ABCDEFGHIJKL

1) Two sub-scans:

Sub-scan #1: ACEGIK

Sub-scan #2: BDFHJL

2) Three sub-scans:

Sub-scan #1: ADGJ

Sub-scan #2: BEHK

Sub-scan #3: CFIL

In preferred embodiments, the partitioning process, i.e., how the windows A-L in the example are obtained, comprises the following basic steps:

1) Partitioning the scan range into equidistant bins (preferred width is half the minimum window width) and calculating their TICs.

2) Clustering bins of similar TIC magnitude to form TIC clusters.

3) Converting the TIC clusters iteratively into partitions of the entire scan range, proceeding in descending order of cluster TICs, until the desired number of windows has been reached.

Example: Scan range m/z 100-1000

1) Processing cluster m/z 200-300 (not tangent to an existing boundary) (C=window resulting from selected cluster, F=window complemented to fill the entire scan range):

a. Window #1: 100-200 (F)

b. Window #2: 200-300 (C)

c. Window #3: 300-1000 (F)

2) Processing cluster m/z 100-150 (tangent to the lower end of the scan range):

a. Window #1: 100-150 (C)

b. Window #2: 150-200 (F)

c. Window #3: 200-300 (C)

d. Window #4: 300-1000 (F)

3) Processing cluster m/z 750-770 (not tangent to an existing boundary):

a. Window #1: 100-150 (C)

b. Window #2: 150-200 (F)

c. Window #3: 200-300 (C)

d. Window #5: 300-750 (F)

e. Window #6: 750-770 (C)

f. Window #7: 770-1000 (F)

4) Processing cluster m/z 280-320: Overlapping with window #3, skip cluster

5) . . .

This procedure is independent of the distribution of m/z windows to the sub-scans. It seeks to optimise the window sizes in order to isolate m/z regions based on TIC patterns, taking parameters such as minimum window width and desired number of windows (total number or per sub-scan) into account. These parameters may be user-defined. Once the windows have been determined, calculating the overlaps and quadrupole transmission flanks (both given by an absolute m/z width and scaling factor for the window width) can proceed as described in further detail below.

Figure 3A:
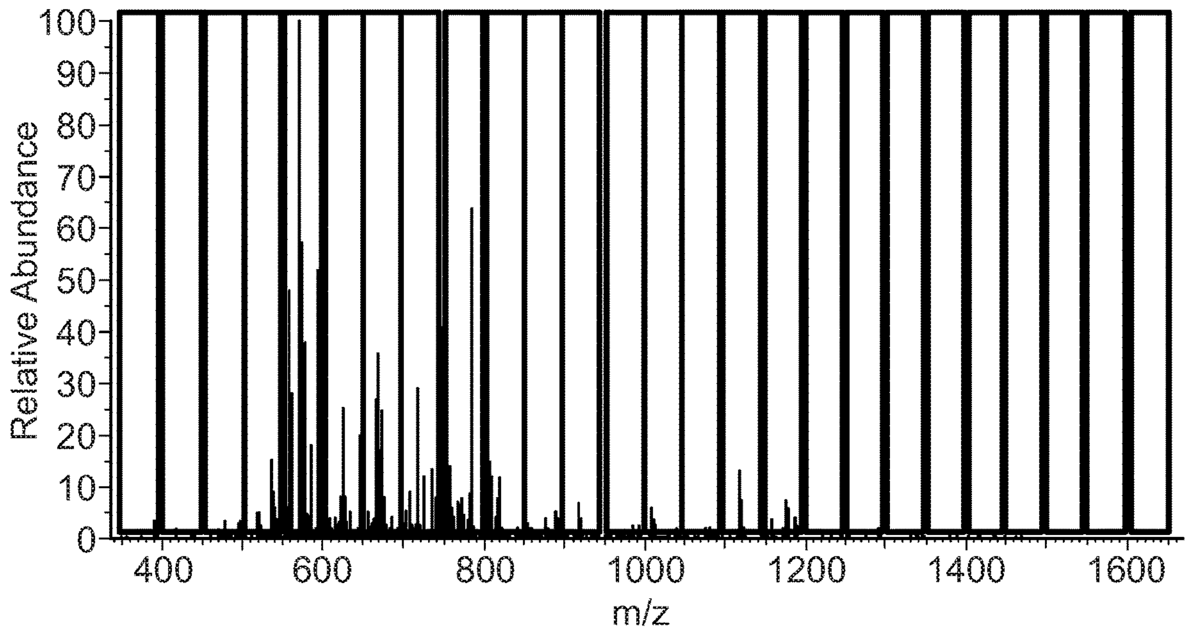
FIGS. 3A to 3G show an example of a method of partitioning an m/z range.
Figure 3B:
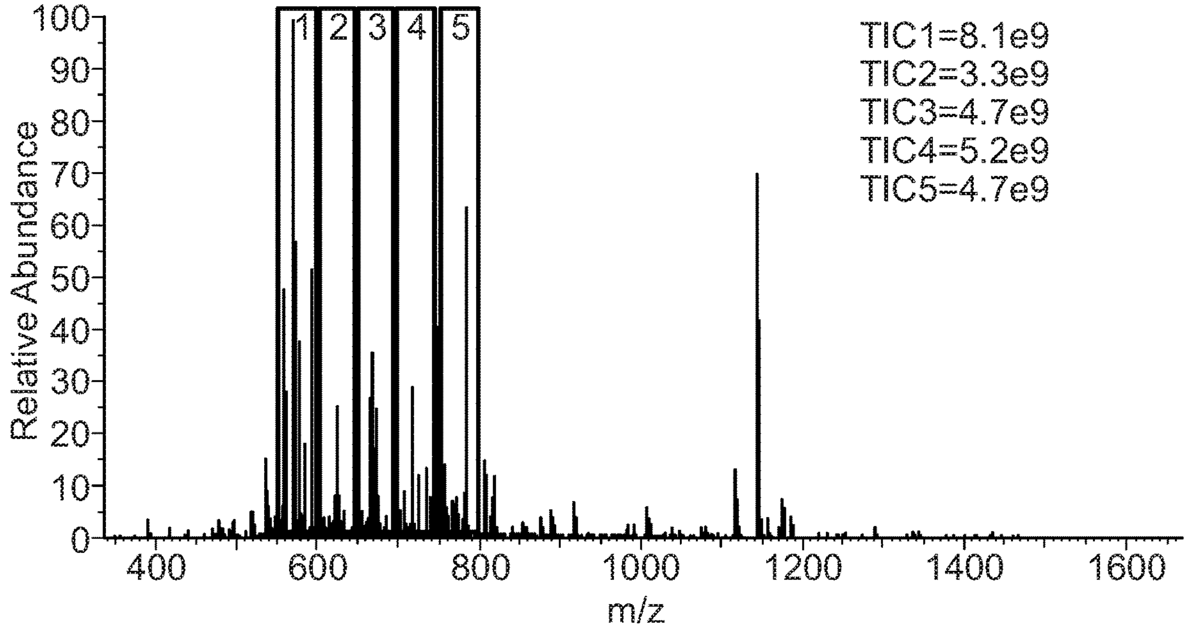
Figure 3C:
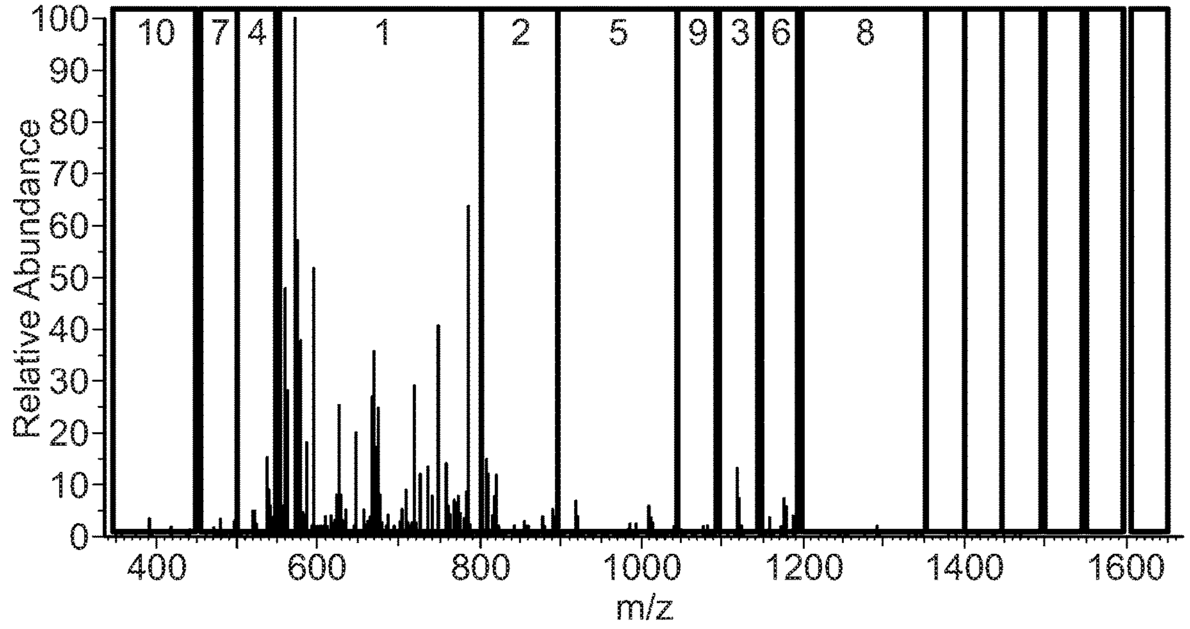

FIGS. 3A to 3G show an example of the process of automatically partitioning an m/z range for real mass spectral data, which may be performed using the methods show in FIGS. 1A and 1B. FIG. 3A shows an exemplary HeLa spectrum, scan range m/z 350-1650, partitioned into 26 bins of size 50 Th (corresponding to a minimum window width of 100 Th). As shown in FIG. 3B, after determining the TIC value of each bin, bins of similar TIC magnitude are clustered together, starting with the highest-TIC bin at m/z 550-600. The four adjacent bins between m/z 600 and 800 are added to form the first cluster ranging from m/z 550 to 800. The resulting TIC clusters sorted by their TIC values in descending order. The top-10 clusters are labelled (1=highest-TIC cluster) in FIG. 3C.

Figure 3D:
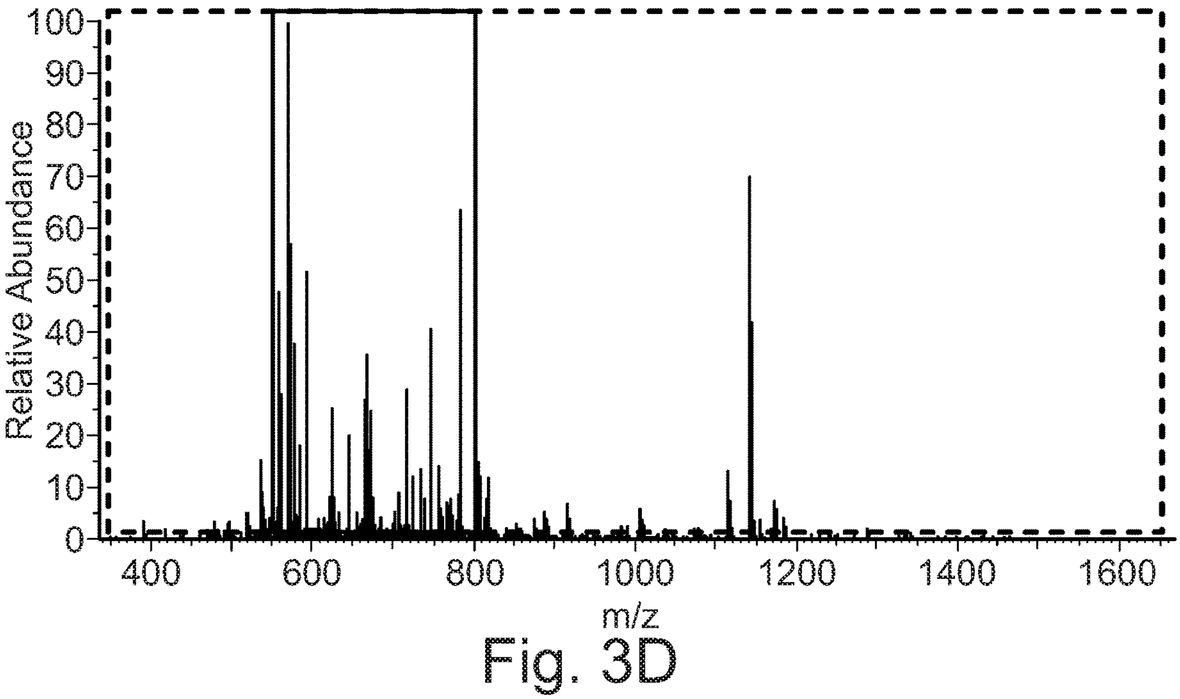
Figure 3E:
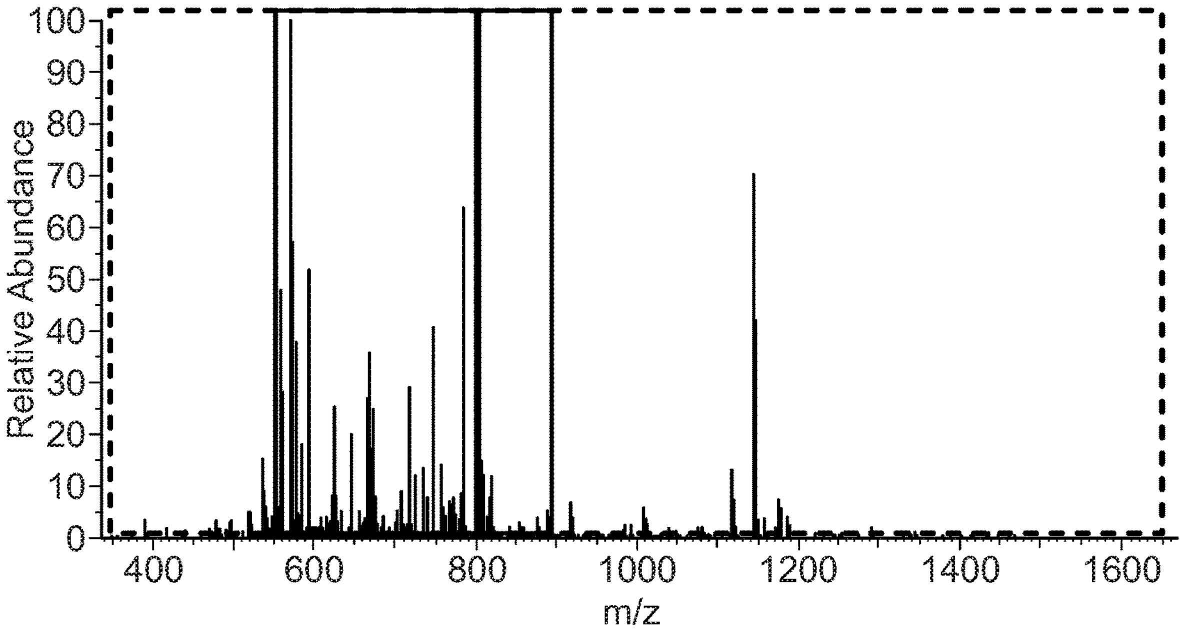
Figure 3F:
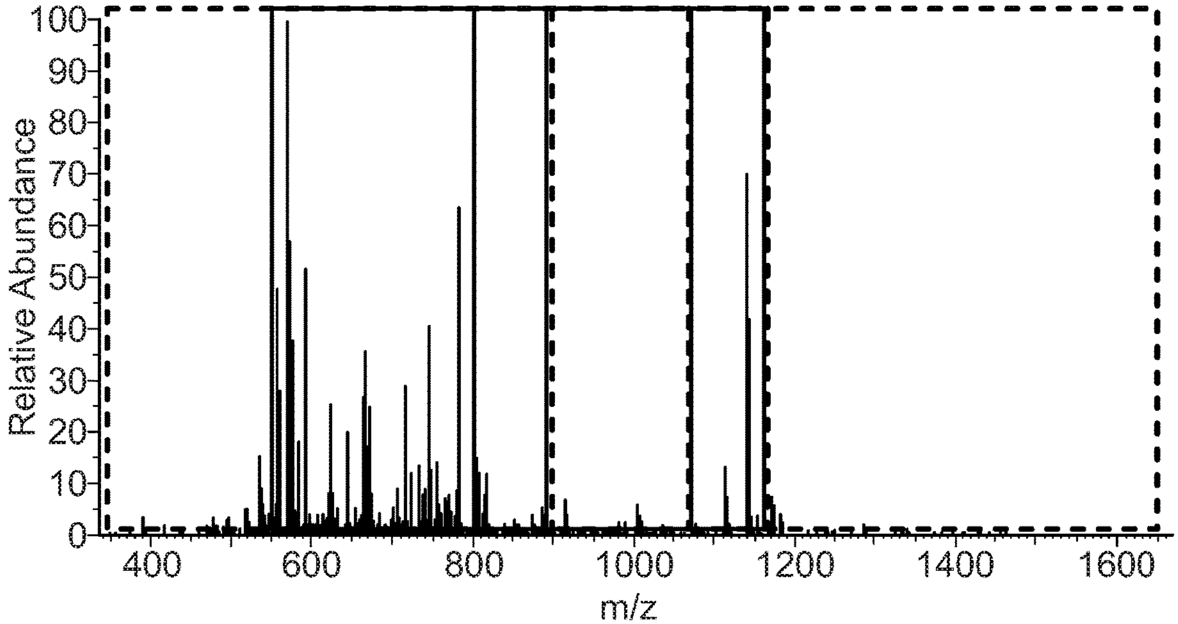

As shown in FIG. 3D, the partitioning procedure starts with the highest-TIC cluster at m/z 550-800 (which is depicted within a solid border). To fully cover the entire scan range, two windows are complemented (shown in broken lines), resulting in three windows, m/z 350-550, m/z 550-800, and m/z 800-1650. In FIG. 3E, a second cluster (m/z 800-900) is adjacent to the first one, resulting in four m/z windows. The dimension of the right complement window is adjusted accordingly (m/z 900-1650). In FIG. 3F, the third cluster (m/z 1100-1150) is extended to meet the required minimum width of 100 Th, yielding m/z 1087.5-1187.5. As it is not tangent to a boundary of any of the existing cluster windows, a third complement window at m/z 900-1087.5 is added, resulting in six windows. The process repeats iteratively.

Figure 3G:
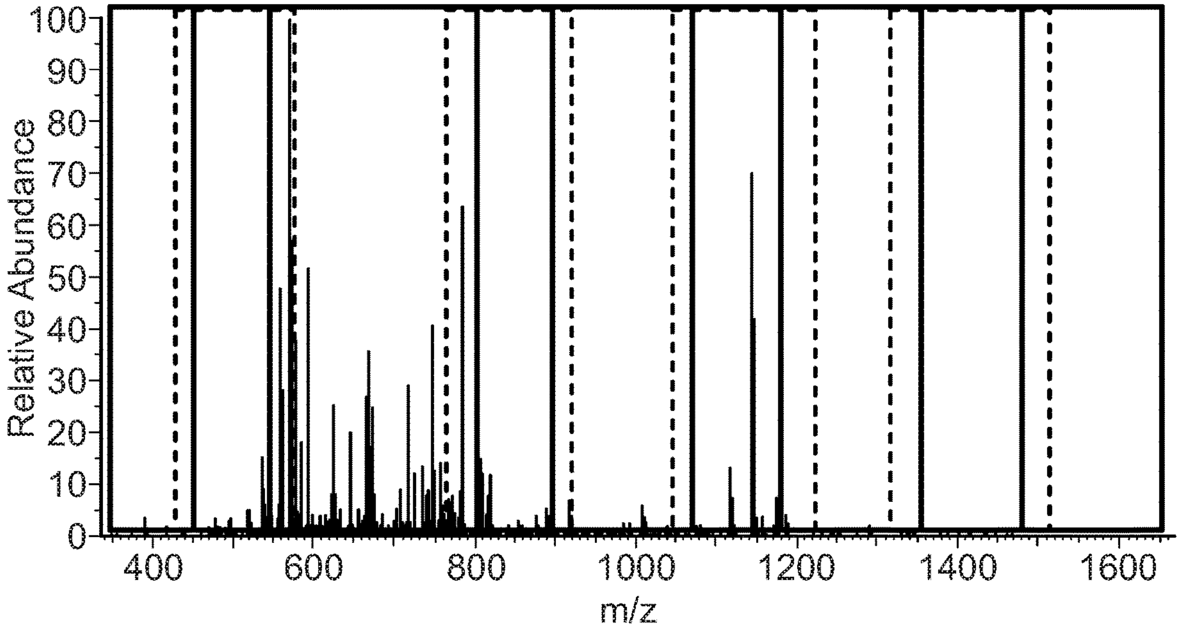

In FIG. 3G, a fully partitioned spectrum is shown, which comprises 9 overlapping m/z windows (5 cluster windows and 4 complement windows). The window overlaps can be calculated during or after the partitioning procedure. Windows depicted within solid borders are to be measured in a first HDR sub-scan, while windows depicted within broken borders are to be measured in a second HDR sub-scan. The first HDR sub-scan would provide a partial mass spectral data set for a first set of m/z sub-ranges and the second HDR sub-scan would provide a partial mass spectral data set for a second set of m/z sub-ranges.

In preferred embodiments of this disclosure, m/z windows can be adapted to the time-dependent composition of the sample. For example, in the first HDR cycle, the partitioning may be based on a standard (non-HDR) full scan, as shown in FIG. 3. Afterwards, a previous HDR scan could be used as the basis for subsequent partitioning, although a standard (i.e. not a HDR scan) can be used.

AGC Improvement

1) Redistribution of Injection Times

To overcome the problem that the available maximum injection time (max. IT) may not be fully exploited, the AGC algorithm of existing systems is enhanced with a redistribution functionality. The redistribution of injection times is performed after the regular determination of injection times and can be implemented in a way that does not interfere with the established AGC algorithm on the Exploris™ instrument. The method of this embodiment provides a method for acquiring mass spectral data of a sample across at least a portion of an m/z range, the m/z range comprising a set (e.g. an HDR sub-scan) of one or more m/z sub-ranges.

First, the injection times are calculated for the m/z sub-ranges without imposing any upper limit to ensure that the max. IT is fully exploited by all sub-ranges. That is, the method commences by determining an initial distribution of injection times comprising an initial injection time for each m/z sub-range of the set of one or more m/z sub-ranges. Once the injection times for the m/z sub-ranges have been determined by the AGC based on a previous analytical scan or AGC pre-scan, the total injection time is calculated as the sum of the individual injection times of the sub-ranges. If the sum exceeds the overall max. IT, the injection times are redistributed as follows:

1. Determine the injection time corresponding to an equal distribution of the total max. IT that is available for the scan:

$$\text{equal\_}IT\text{=overall\_max\_}IT/N$$

2. Calculate the sum sum_exceeding of those injection times that exceed equal_IT, and sum_remaining as the remaining overall injection time after subtracting those injection times that are below or equal to equal_IT (sum_remaining≤overall_max_IT).

3. Sort the injection times that exceed equal_IT in ascending order.

4. Process the sorted injection times from step 3, starting with the lowest value:

a. Calculate the new injection time from the currently allotted time old_IT:

$$\text{new\_IT} = \max\left(\text{equal\_IT}, \frac{\text{sum\_remaining}}{\text{sum\_exceeding}} * \text{old\_IT}\right)$$

b. Decrease the sum_exceeding variable by old_IT.

c. Decrease the sum_remaining variable by new_IT.

Thus, the method comprises determining an adjusted distribution of injection times comprising an adjusted injection time for each m/z sub-range, based on determining that a total time of the initial distribution of injection times exceeds a total available injection time for acquiring the mass spectral data. Determining the adjusted distribution of injection times may comprise reducing one or more relatively long initial injection times by a greater extent than one or more relatively short initial injection times. For instance, long initial injection times may be preferentially reduced by a greater extent.

In the redistribution algorithm outlined above, equal_IT acts as a threshold value. Step 4a uses a dynamic factor to adjust the currently allotted injection time of an m/z sub-range for certain sub-ranges, based on the threshold value equal_IT. Processing the injection times in ascending order ensures that the lower injection times are not reduced beyond equal_IT, and that the final sum does not exceed overall_max_IT.

As an example, consider an HDR experiment with N=10 sub-ranges and an overall max. IT of 100 ms, resulting in an equally distributed injection time of 10 ms, as shown in Table 2. Table 1 shows Injection Times (IT) in ms for 10 m/z sub-ranges from an existing AGC algorithm ("Old IT") and IT values as derived from the redistribution algorithm ("New IT").

TABLE 2

| | #1 | #2 | #3 | #4 | #5 | #6 | #7 | #8 | #9 | #10 | Σ |
|---|---|---|---|---|---|---|---|---|---|---|---|
| Old IT | 0.1 | 1 | 3 | 5 | 10 | 25 | 50 | 75 | 90 | 100 | 359.1 |
| New IT | 0.1 | 1 | 3 | 5 | 10 | 10 | 11.25 | 16.88 | 20.26 | 22.51 | 100 |

With a max. IT setting of 100 ms for each sub-range for the initial AGC calculation, 5 sub-ranges are assigned injection times ≤10 ms by the AGC, whereas the remaining 5 sub-ranges exceed the equal injection time (>10 ms). The remaining time of 80.9 ms (i.e. 0.1 ms 1, 3 ms, 5 ms and 10 ms subtracted from 100 ms) is then redistributed to the 5 sub-ranges that exceed the equal setting (#6-#10). Using the steps 4a-4c described above, injection time #6 is reduced to 10 ms first, then injection time #7 is reduced to ~11 ms, finally #10 is reduced to ~23 ms, resulting in a total injection time of 100 ms. Thus, the unused injection time from sub-ranges #1 to #4 could be distributed to 4 of the 5 sub-ranges (#7 to #10). It can be seen that several adjusted injection times (New IT) are the same as the initial injection times (Old IT). Specifically, the adjusted distribution of injection times comprises several injection times (#1-#5) that are unchanged from the values in the initial distribution.

Hence, it can be seen that, determining the adjusted distribution of injection times comprises reducing at least one of the initial injection times for a respective m/z sub-range, such that a total time of the adjusted distribution of injection times for the set of one or more m/z sub-ranges is no greater than the total available injection time for acquiring the mass spectral data. In this case, injection times for sub-ranges #6-#10 are reduced. The longest initial injection times are reduced to approximately 22.51% of their initial value, while window #6 is reduced to 40% of its initial value and windows #1-#15 are not reduced at all. Thus, relatively long initial injection times may be reduced by a greater extent (e.g. in terms of absolute value, or in terms of percentage) than one or more relatively short initial injection times.

Determining the adjusted distribution of injection times may comprise reducing at least one, and optionally each, initial injection time that exceeds a threshold injection time. In some embodiments, the methods comprise reducing a plurality of (e.g. each) initial injection times that exceed a threshold injection time by a scaling factor (which could be a static scaling factor, or which could be a dynamic scaling factor that is calculated iteratively such as in step 4 of the above algorithm). To avoid reducing relatively short injection times too much, the methods of this disclosure may comprise setting the threshold injection time as the adjusted injection time for each m/z sub-range for which the initial injection time reduced by the scaling factor is less than the threshold injection time.

Determining the adjusted distribution of injection times may comprises: determining a total spare injection time by summing, for each m/z sub-range for which the initial injection time is less than the threshold injection time, a difference between the initial injection time and the threshold injection time; and setting an adjusted injection time for one or more m/z sub-ranges for which the initial injection time is greater than the threshold injection time, by distributing the total spare injection, thereby increasing the initial injection times for the one or more (e.g. some or each) m/z sub-ranges for which the initial injection time is greater than the threshold injection time. Thus, an efficient redistribution of "spare" injection times can be achieved. The threshold injection time is equal to the total available injection time divided equally between the one or more m/z sub-ranges (equal_IT).

As an alternative to the distribution method described above, the injection times calculated by the AGC could simply be scaled equally with a scaling factor given by the ratio of the overall max. IT and the sum of calculated injection times. In the example outlined in Table 2, the scaling factor would be 100/369.1=27%, so sub-ranges #1 and #10 would be assigned 0.027 ms and 27 ms, respectively. To prevent the scaling factor from being dominated by very high injection times, an upper limit could be applied to the calculated injection times. Therefore, determining the adjusted distribution of injection times could comprise reducing the initial injection times for each respective m/z sub-range. Determining the adjusted distribution of injection times may comprise reducing the initial injection times for each respective m/z sub-range by a scaling factor (e.g. all reduced by the same scaling factor, or different scaling factors could be used).

Moreover, m/z sub-ranges in those spectral regions that are of higher interest for a post-processing analysis than others may be preferred and given higher injection times (or AGC targets, see below). Such preferential regions could be specified in advance by the user and considered by the instrument when (re-)distributing AGC targets and/or injection times.

Hence, the method may comprise receiving an indication (which could be a user input, or which could be determined automatically) that an m/z sub-range is an m/z sub-range of interest; and setting a relatively high adjusted injection time for the m/z sub-range of interest. In particular, the algorithm may assign an injection time that is higher than would be assigned using an equal distribution algorithm.

2) Using Sub-Range-Specific AGC Targets

In the current AGC implementation, the total AGC target as specified by the user for the full scan is by default divided equally between the sub-ranges. For example, for a full scan with an AGC target of 1e6 and 10 scans per HDR sub-scan, each sub-range is allotted a target value of 1 e5 by default. However, this equal distribution may be detrimental under certain circumstances. For example, if the TIC of a narrow sub-range is dominated by a single peak, its AGC target could be reduced to avoid mass deviations caused by space charge effects. The procedure of detecting a TIC dominance and reducing the target accordingly can be handled automatically by the instrument for each sub-range. Additionally, the distribution of AGC targets may be based on spectral preferences for a post-processing analysis.

Hence, determining the adjusted distribution of injection times may comprise adjusting (e.g. reducing) the initial injection time for an m/z sub-range based on an indication of ion abundance for the respective m/z sub-range. For example, determining the adjusted distribution of injection times may comprise reducing the initial injection time for an m/z sub-range based on an indication that the ion abundance for the respective m/z sub-range is caused by a single m/z peak. For example, if a certain percentage of TIC (or another measure of abundance) is attributable to one particular m/z value (or a very narrow m/z range, such as an m/z range covering isotopic clusters), then this may be taken as an indication that the ion abundance for the respective m/z sub-range is substantially caused by a single m/z peak.

Stitching of m/z Sub-Ranges

In the final step of the HDR scan workflow shown in FIG. 1A, the mass spectral data from the m/z sub-ranges from the HDR sub-scans are combined to produce a full scan spectrum, which can be treated and processed further like a standard full scan. For each sub-range, the centroid and profile data of the MS peaks are copied into the resulting full scan spectrum. The overlap between adjacent sub-ranges increases the flexibility in so far as the start and end m/z value of the copy operation can be determined individually within the overlap regions, since the contained data are, in principle, available twice. Thus, the method comprises, in general terms, determining first and second sets of m/z sub-ranges comprises, by setting the first and second sets of m/z sub-ranges such that a relatively high transmission region of a first response profile at least partially overlaps a relatively high transmission region of a second response profile. The methods may comprise obtaining a plurality of partial mass spectral data sets using the methods described herein; and combining (e.g. stitching) the plurality of partial mass spectral data sets into a single mass spectral data set.

The methods preferably comprise actively determining the sub-ranges to ensure that they overlap. Thus, there may be a step of determining whether the relatively high transmission region of the first response profile at least partially overlaps the relatively high transmission region of the second response profile; and based on determining that the relatively high transmission region of the first response profile does not at least partially overlap the relatively high transmission region of the second response profile, adjusting the first and/or second sets of m/z sub-ranges such that the relatively high transmission region of the first response profile at least partially overlaps the relatively high transmission region of the second response profile. Each m/z sub-range in a given set of m/z sub-ranges preferably at least partially overlaps an m/z sub-range of a different set of m/z sub-ranges. Thus, the m/z sub-ranges of the different sets may collectively span the m/z range. Each set of m/z sub-ranges may comprise a plurality of m/z sub-ranges that are spaced apart. For instance, the m/z sub-ranges of each of the plurality of sets of m/z sub-ranges may be interleaved along the m/z axis. Each m/z sub-range of a first set of m/z sub-ranges is contiguous (e.g. directly border) with an m/z sub-range of a second set of m/z sub-ranges.

It will be understood that when multiple sub-scans are performed for multiple sets of m/z sub-ranges with each set of m/z sub-ranges comprising a plurality m/z sub-ranges, there will be a large number of m/z sub-ranges that can be expanded to ensure that they overlap. Thus, for example, the first set of m/z sub-ranges may comprise a first plurality of m/z sub-ranges and the first mass filter may have a plurality of response profiles each comprising, for each m/z sub-range of the first set: a relatively high transmission region; and one or more relatively low transmission regions. That is, the m/z sub-ranges of a first sub-scan may be associated with a plurality of response profiles spaced apart along the m/z axis. Similarly, a second set of m/z sub-ranges may comprise a second plurality of m/z sub-ranges and the second mass filter may have a plurality of response profiles each comprising, for each m/z sub-range of the second set: a relatively high transmission region; and one or more relatively low transmission regions. In such cases, advantageously, the step of determining the first and second sets of m/z sub-ranges may comprise setting the first and second sets of m/z sub-ranges such that: each relatively high transmission region of a respective response profile of the first mass filter at least partially overlaps a relatively high transmission region of a respective response profile of the second mass filter. Therefore, a plurality of overlapping m/z sub-ranges may be formed.

It will be appreciated that this method can be extended to any number of sub-scans and is not limited to two sets of m/z sub-ranges. For example, if a third set of m/z sub-ranges is desired, then the response profiles related to the third set may at least partially overlap a response profile of the second mass filter on the left hand side and may also overlap response profile of the first mass filter on the right hand side. The disclosure may also be extended to a fourth set of m/z sub-ranges. In such a case: the response profiles associated with the first set may overlap the response profiles associated with the fourth set and the second set; the response profiles associated with the second set may overlap the response profiles associated with the first set and the third set; the response profiles associated with the third set may overlap the response profiles associated with the second set and the fourth set; and the response profiles associated with the fourth set may overlap the response profiles associated with the third set and the first set. This pattern may be repeated for any number of sets of m/z sub-ranges.

The presence of overlap regions allows omitting the data from the quadrupole flank regions of the sub-ranges, which can be replaced with the data from the high-transmission region of the adjacent sub-ranges. If the sub-range overlaps are too small to extend beyond the flank regions, a correction of the peak intensities at the edges of the sub-ranges is necessary. This intensity correction usually requires a standard full scan to be acquired along with the HDR scans during the entire experiment, as well as an additional post-processing step to determine the correction factors by comparing the peak intensities of the HDR scan with those of a standard full scan (as described by F. Meier et al., for example).

If the overlaps are large enough, however, the regular acquisition of full scans as well as the additional correction step can be avoided to save time.

The stitching procedure operates on the sub-ranges w, (i=1 . . . N), each associated with a sub-scan j=1 . . . m. With a typical setting of m=2 sub-scans, sub-ranges #1, #3, #5, . . . originate from sub-scan #1, whereas sub-ranges #2, #4, #6, . . . originate from sub-scan #2. The sub-ranges are stitched successively, starting with the lowest-m/z sub-range $w_1$. Due to the redundancy of the data in the overlap region shared with the adjacent sub-range $w_2$, the end-m/z value of the copy operation for $w_1$ can be chosen freely within the overlap region, taking the following aspects into account:

- The end-m/z should lie outside of the low-transmission regions of both $w_1$ and $w_2$.
- The end-m/z should be chosen to preserve isotope distributions in both sub-ranges. Cutting isotope distributions such that one part comes from sub-scan #1 and the other from sub-scan #2 should be avoided to keep the intensities consistent at the molecular species level.

In a general sense, the methods described herein may comprise determining an end-m/z value that is within an intersection of a first m/z sub-range of the first set of m/z sub ranges and a second m/z sub-range of the second set of m/z sub ranges; and including in a single mass spectral data set: mass spectral data from between: the end-m/z value; and an endpoint of the first m/z sub-range; and mass spectral data from between: the end-m/z value; and an endpoint of the second m/z sub-range. Thus, data from overlapping windows can be stored, with the end-m/z value acting as a cut-off point at which the m/z data of the single data set switches from being obtained from a first window to being obtained from a second window. The intersection of the first m/z sub-range and the second m/z sub-range may include at least a portion of the relatively high transmission region of the first response profile and at least a portion of the relatively high transmission region of the second response profile. Moreover, the end-m/z value may be determined based on a distribution of isotopes (e.g. determined so as to avoid splitting isotopic peak clusters) in the first and/or the second m/z sub-ranges.

If it is not possible to select an end-m/z such that all found isotope distributions are copied only from one or another sub-range, i.e. if all possible end-m/z values are cutting at least one isotope distribution, then all peaks within the overlap region are copied from one of the sub-ranges exclusively. If the noise-weighted TIC of the overlap region of the first sub-range is higher than that of the second sub-range, peaks are copied from $w_1$ until reaching the low-transmission region (right flank) of $w_1$. Otherwise, peaks are copied from $w_1$ until reaching the high-transmission region (left flank) of $w_2$. The detailed procedure is outlined below. For instance, the methods may comprise determining which of the first m/z sub-range and the second m/z sub-range is associated with a higher ion abundance (e.g. the noise-weighted TIC of the overlap region); and combining the plurality of partial mass spectral data sets into a single mass spectral data set may comprise including in the single mass spectral data set the mass spectral data from the one of the first m/z sub-range and the second m/z sub-range that is associated with the higher ion abundance.

Figure 4A:
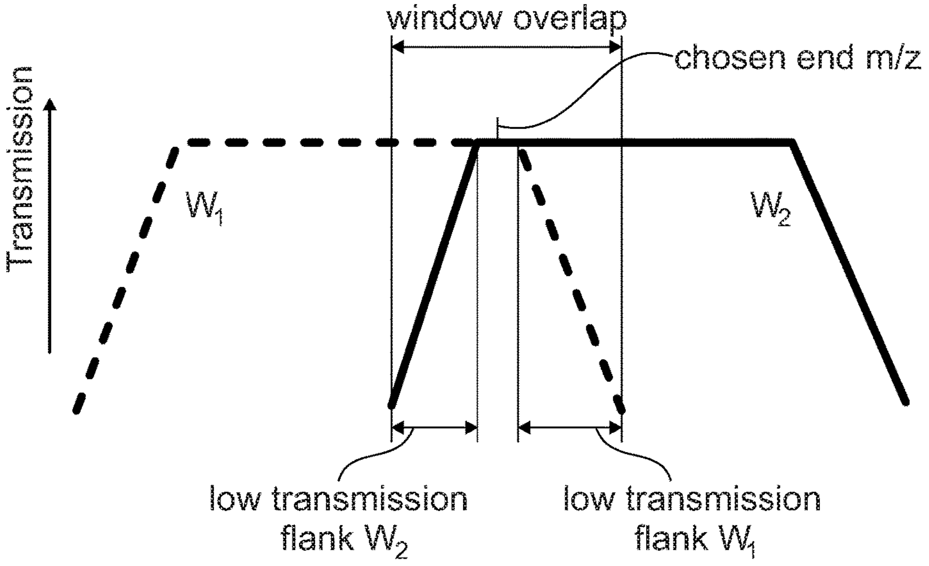
FIG. 4A shows schematically quadrupole transmission flanks.

In FIG. 4A, overlapping windows $w_1$ and $w_2$ are shown schematically. $w_1$ and $w_2$ overlap and the overlap includes the low transmission flanks of $w_1$ and $w_2$ as well. The overlapping region also includes the intersection of the high transmission regions of each window, from which a chosen end-m/z value is selected.

Figure 4B:
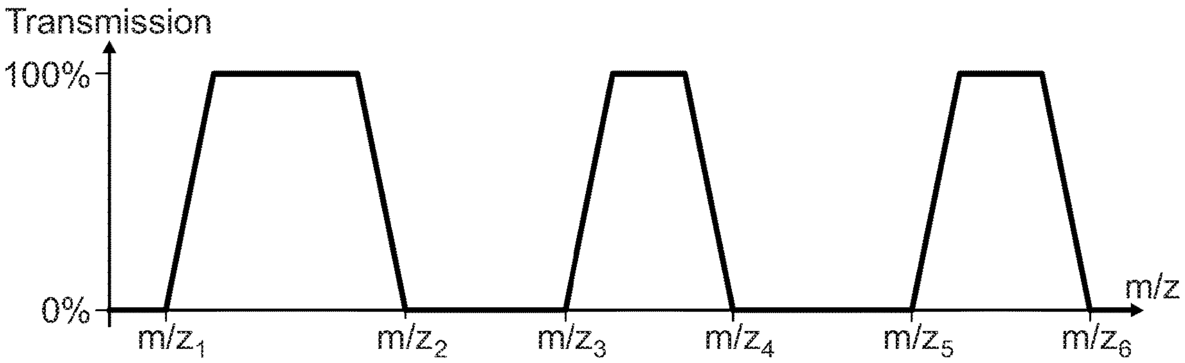
FIG. 4B shows a set of response profiles for m/z sub-ranges.

FIG. 4B shows a set of response profiles for different m/z sub-ranges that are spaced apart along the m/z axis. A single mass filter may have a different response profile in different m/z sub-ranges. Three distinct response profiles are shown: a first response profile is between $m/z_1$ and $m/z_2$; a second response profile is between $m/z_3$ and $m/z_4$; and a third response profile is between $m/z_5$ and $m/z_6$. In some embodiments of this disclosure, multiple such sets of m/z sub-ranges collectively span a full m/z scan range of interest. Embodiments of this disclosure compensate for the trapezoidal nature of the response profiles, by ensuring that sets of m/z sub-ranges (such as the set shown in FIG. 4B) are formed so that they overlap in the way shown in FIG. 4A.

Once overlapping m/z sub-ranges are determined, the sample may be mass filtered to isolate ions in the first and second m/z sub-ranges using first and second mass filters having first and second response profiles corresponding to the first and second m/z sub-ranges. The first and second response profiles each have a relatively high transmission region and one or more relatively low transmission regions.

Then, partial mass spectral data sets are obtained by performing mass analysis on the sample across the first and second m/z sub-ranges. These partial mass spectral data sets can then be stitched together (although they could simply be stored as separate partial mass spectra).

To stitch the sub-range or window $w_i$, the high-transmission overlap region shared with the adjacent sub-range on the right side, $w_{i+1}$, is first analysed with respect to the TICs and isotope distributions contained in the respective regions of $w_i$ and $w_{i+1}$. The boundaries of the "raw" overlap region are given by the start-m/z of $w_{i+1}$ and the end-m/z of $w_i$, i.e., it ranges from $w_{i+1,start}$ to $w_{i,end}$, or $o_1$ to $o_2$. Due to the trapezoid shape of the mass filter (a quadrupole in preferred embodiments) isolation, the overlap region is narrowed by the low-transmission flanks to yield the high-transmission overlap region $o_1'$ to $o_2'$. Table 3 shows example m/z dimensions and overlaps of the first HDR sub-range and its neighbour.

TABLE 3

| | Window #1 (m/z) | Window #2 (m/z) |
|---|---|---|
| Raw dimension, including overlap | 350-431.3 | 414.1-495.5 |
| High-transmission dimension, including overlap | 350-427.1 | 418.4-491.2 |
| Raw overlap region ($o_1$-$o_2$) | 414.1-431.3 | |
| High-transmission overlap region ($o_1'$-$o_2'$) | 418.4-427.1 | |

The TIC in the high-transmission overlap region is determined for the sub-scans 1 and 2 associated with the windows $w_i$ and $w_{i+1}$ (referred to as window 1 and 2 henceforth, for simplicity), respectively, and the resulting values are divided by the average noise values $N_{av}$ for both sub-scans in this region, yielding $(TIC/N_{av})_1$ and $(TIC/N_{av})_2$, thus accounting for different signal-to-noise levels of the sub-scans. If $(TIC/N_{av})_1 \geq (TIC/N_{av})_2$, the usage of signals from sub-scan 1 is preferred (vice versa if $(TIC/N_{av})_1 < (TIC/N_{av})_2$). For both windows, the distribution of isotope clusters in the overlap region is evaluated:

For window/sub-scan 1, determine the right-most isotope distribution that still lies within the usable high-transmission window, i.e., its highest-m/z peak is closest to the right border $o_2'$. The highest-m/z peak of this isotope distribution marks the m/z threshold for sub-scan 1, scan1_thresh. If there is no isotope distribution that meets the criteria, scan1_thresh is set to $o_2'$.

For window/sub-scan 2, determine the left-most isotope distribution that spans across the windows, i.e., its lowest-m/z peak is closest to the left border $o_1'$, whilst its highest-m/z peak exceeds the right-border $o_2'$. The lowest-m/z peak of this isotope distribution marks the m/z threshold for sub-scan 2, scan2_thresh. If there is no isotope distribution that meets the criteria, scan2_thresh is set to $o_2'$.

The isotope distributions can be determined for each sub-scan in a previous step by applying a charge state detection/deconvolution algorithm to the sub-scans, for example the APD algorithm described in U.S. Pat. No. 10,593,530, which is incorporated herein by reference. For example, the methods disclosed herein may include a step of identifying peak groups with spacings and/or intensities that resemble isotope clusters.

The m/z threshold for copying signals from sub-scan 1 and 2, copy_thresh, is determined based on the m/z thresholds scan1_thresh and scan2_thresh. Signals with m/z values below copy_thresh are copied from sub-scan 1 into the resulting HDR scan. The copy operation for window 2 in the subsequent cycle then starts at copy_thresh. If scan1_thresh and scan2_thresh are equal, copy_thresh is set to scan1_thresh. Otherwise, copy_thresh is determined as follows:

If scan2_thresh>scan1_thresh, set copy_thresh to scan2_thresh. The reasoning is that more signals from sub-scan 1 are used in this case due to the better overall S/N of window 1 (vice versa if sub-scan 2 has better overall S/N).

If scan2_thresh≤scan1_thresh, the isotope distributions (ISD) found in the previous step are evaluated with respect to their S/N values: If the ISD found for window 1 has a better S/N than the ISD found for window 2, copy_thresh is set to scan1_thresh (scan2_thresh otherwise).

The peak that is last copied from sub-scan 1 (if copy_thresh=scan1_thresh) or first copied from sub-scan 2 (if copy_thresh=scan2_thresh) may occur as a slightly shifted duplicate in the other sub-scan. Therefore, the other sub-scan may be checked for a duplicate of the last or first included peak and the threshold may be adjusted accordingly (if necessary). That is, there may be a step of determining whether a first partial mass spectral data set is consistent (e.g. in an overlapping region) with a second partial mass spectral data set. If the sets are not consistent, then corrective action may be taken. For instance, an m/z threshold for copying signals from sub-scans may be adjusted. Alternatively, an alert may be raised when data are not consistent.

Peak centroids, peak profiles, and noise data are copied from sub-scan 1 to the HDR full scan until reaching copy_thresh. Then the next pair of windows and sub-scans, corresponding to $w_{i+1}$ and $w_{i+2}$, is processed, and the copy operation for $w_{i+1}$ starts at the lowest m/z above copy_thresh. The last window $w_N$ is copied as-is starting from the previous copy_thresh calculated for $w_{N-1}$.

In some cases, the methods described herein may comprise determining which of a first m/z sub-range and a second m/z sub-range is associated with a higher signal-to-noise ratio; and combining the plurality of partial mass spectral data sets into a single mass spectral data set may comprise including in the single mass spectral data set the mass spectral data from the one of the first m/z sub-range and the second m/z sub-range that is associated with the higher signal-to-noise ratio. Thus, data exhibiting a good signal-to-noise ratio may be used in the stitching procedures of this disclosure.

Hybrid HDR Scans

As an alternative to the methods described above, in which multiple HDR sub-scans are stitched together to obtain a HDR full scan, a "hybrid" approach could be used, comprising a standard full scan and a single HDR "zoom" scan (or a small number of sub-scans) composed of selected, non-overlapping m/z sub-ranges. This has the advantage of keeping a standard full scan as a reference for quantitation, whereas the single HDR "zoom" scan provides deeper insights into sparse regions of the full scan. These regions in the standard full scan could be replaced with the corresponding m/z sub-ranges from the HDR scan (sub-scans) to obtain a hybrid HDR full scan. If this hybrid HDR workflow comprises two scan events, then the scan rate performance is comparable to the approach using two HDR sub-scans.

Sparse regions in the full scan can be determined using the procedure described in the step Automatic partitioning of the scan range. From the resulting m/z sub-ranges, only those with low TIC values that do not overlap are analysed in the HDR scan, whereas those with high TIC values are not analysed separately but simply taken from the full scan.

To obtain the hybrid HDR scan, spectral "sections" from the standard full scan can be stitched with the HDR sub-ranges as described above. The "sections" from the full scan can be treated like the HDR sub-ranges, the difference being that the "sections" do not exhibit low-transmission flanks of the quadrupole isolation, which makes the selection of the stitching boundaries more flexible.

Some applications require the fastest possible method with increased dynamic range. Simply, to maximise the increase in dynamic range while minimising the increase in total analysis time caused by additional full MS scans, it should be possible to make a standard full MS scan with smaller frequency than a "zoom" scan. Stitching may also be performed at a reduced frequency, only when standard and "zoom" sub-scans are measured in sequence. Criteria for reduced frequency can be based on LC peak width. For example, if the average duration of compound elution from an LC is about 30 seconds, then standard full MS scan and stitching with "zoom" sub-scan may be performed only every 10 seconds. At the same time, a "zoom" scan independently may still be measured every second or two (which is a typical period for full MS scans in DDA). This way, extra MS scans can be reduced by about 10 times, with a minimum loss of information/peaks. The lost peaks are expected to be mainly in a middle of total measured dynamic range, which elute in close proximity to abundant peaks in RT and m/z domains. Such peaks can have strongly reduced retention time, because they are injected into instrument together with abundant peaks and, as result, only a top part of their LC elution profile can be detected by MS. Such modes can be used in applications where the total analysis time should be as small as possible, but still requires the highest possible dynamic range of MS analysis. e.g. big cohort studies.

Additional possible modifications to the HDR "zoom" mode can be applied, when changed ion optics settings (DC and RF voltages) may be advantageous. Such alternative ion optics settings can be applied not to all sub-scans/scans, but only to some m/z windows/ranges, sub-scans/scans:

- to only selected m/z windows (targeted approach)
- to one or few sub-scans (e.g. only to "zoom" sub-scans or instead only to full MS scan)

For example, to reduce labile ion fragmentation, mild trapping settings can be applied. However, this mode can increase injection time and decrease the stable working time of the instrument, as a bigger portion of ions land on an ion optics element and lead to faster contamination and resulted ion charging (which worsens instrument robustness). Instead, it is possible to apply "mild trapping" settings only to selected m/z windows (targeted approach) or only to "zoom" sub-scan(s) (to improve signal intensity of labile low abundant ions) or only to full MS scan (to reduce impact on instrument robustness). When different ion optics settings (DC and RF voltages) are used, extra control of ion optics can be obtained, different to typical operation of Instrument. GB-2,585,372 describes ways in which ion optics can be controlled and is incorporated herein by reference. GB2108949.5 describes optimising ion optics for better transmission of labile ions, and the methods for controlling ion optics are also incorporated herein by reference.

In generalised terms, in the methods of the present disclosure, at least one mass analysis may be performed using different instrumental parameters (e.g. ion optics settings such as DC and RF). The instrumental parameters may be determined based on various factors, such as the m/z of the ions under analysis, or based on ion abundances in the sample. The methods may comprise performing mass analysis on one or more m/z sub-ranges of a respective set using ion optics settings determined based on (e.g. based on data from a previous pre-scan or a previous HDR scan) ion abundances in the sample.

In hybrid approaches, there may be a step of performing a full-range mass analysis on the sample across an m/z range and adjusting mass spectral data of at least one partial mass spectral data set based on the full-range mass analysis on the sample across the m/z range. For instance, a full scan can be used to normalise data from one or more partial scans. This same process of using a standard scan as a quantitative baseline can also be implemented for HDR sub-scans that fully span the m/z range and are not exclusively applicable to hybrid standard/HDR scans.

Automatic Optimisation of Number of Scans M and/or Number of m/z Windows N (N×M Optimisation)

The equidistant and automatic-partitioning m/z windows algorithms may receive as a total number of desired m/z windows N as an input. During an LC/MS experiment, the composition of the mass spectra can vary significantly: varying from very sparse, to very dense spectra, with relatively equal distribution of intensity over all the peaks to a concentration of most of the signal only in 1-3 most abundant peaks. As a consequence, the best performing HDR scans can be observed with different number of m/z windows at different points in time during a LC/MS experiment. Thus, in some embodiments, an automatic determination and selection of an optimum number of desired m/z windows N during LC/MS experiment can be implemented in real-time. For this optimisation, criteria and limitations may be defined.

For instance, the number of m/z sub-ranges (N) in each set of m/z sub-ranges may be at least one of: constant; configurable by a user; and/or determined based on mass spectral data (obtained from, for example, a supplementary scan, or a previous HDR scan) of the sample. Additionally or alternatively, the number of sets of m/z sub-ranges (M) in the plurality of sets of m/z sub-ranges may be at least one of: constant; configurable by a user; and/or determined dynamically based on (obtained from, for example, a supplementary scan, or a previous HDR scan) mass spectral data of the sample. N and/or M may be varied continuously through an experiment. N and/or M may be determined in accordance with an optimisation procedure as described below.

Thus, in general terms, the methods of this disclosure may perform an optimisation procedure on the number of m/z sub-ranges in each set of m/z sub-ranges and/or the number of sets of m/z sub-ranges in the plurality of sets of m/z sub-ranges. The optimisation procedure may be based on at least one of: a dynamic range of the mass analysis; and/or a total available time for performing the mass analysis.

Optional Starting Conditions and Limitations for N×M Optimisation

- Scanning and m/z partitioning method: auto, equidistant or custom, or combination of different methods, or hybrid HDR scans
- Fixed number of sub-scans M or range of allowed sub-scans number: from min_M to max M
- Maximum duration for one cycle of extra sub-scans (includes all injection time and technical switching time between m/z windows and sub-scans)
- Fixed number of m/z windows N or allowed range: from min_N to max_N. max_N can be defined as ratio of total mass range (delta between LM and FM) and min_width (from Table 1)

The parameters N and M can be optimised at this stage for little additional time, for example by selecting a minimum allowed sub-scans number and introducing the additional limitation that: the sum of injection time plus technical time should not exceed total duration of extra sub-scans.

Optional Optimisation Strategies

The parameters N and M may be optimised to achieve:

Maximum dynamic range

Maximum ratio of dynamic range gain and total duration of extra sub-scans (i.e. best win with minimum increase in total measurement time)

This optimisation may occur repeatedly during an experiment, to determine new sets of m/z sub-ranges as the composition of a sample evolves.

Optional N×M Optimisation Algorithm

The following optimisation algorithm may be applied each time partitioning of m/z-sub-ranges is initiated. Starting with one pair of values for M and N:

1. For every allowed sub-scans numbers M repeat steps below

2. Repeat m/z-windows partitioning process for selected N and given starting conditions and limitations 3. With the found windows partitioning and spread over given M, calculate one or more optimisation criteria and add all as one record to an optimisation history 4. Based on all optimisation history for a given M, select next number of windows N 5. Evaluate, based on the optimisation method used, if the optimisation of N for a given M is finished. The evaluation can be performed using a gradient method, by simple iteration over whole allow N range or using another method. If N optimisation is not finished—go to step 2.

6. If optimisation for N is finished—save final result of N optimisation for given M and go to step 1 with another M from allowed range. If no more M from allowed range is available—go to next.

7. Compare all found N optimisation results for every allowed M, and select one that best satisfies the one or more optimisation criteria.

Main Goals of N×M Optimisation

Over-partitioning of the scan range should be avoided. This occurs when an increased number of m/z windows leads to a reduced reached dynamic range. Over-partitioning can be caused by a reduced duty cycle of sample usage per m/z window, e.g.:

1. Consider that on one before the last partitioning step, the average size window with low abundant peaks would be assigned 2.5× injection time and AGC target is not reached, 2. The partitioning algorithm without extra N×M optimisation will end up with 1× injection time per half of window size, and 0.5× injection time will be lost for technical time to switch between windows—

3. i.e. in this example, if the partitioning algorithm were to be stopped on one before last step, 2.5× signal gain can be achieved for each peak.

In cases where there are strict limitations for experiment time, it can be important to stop partitioning when reasonable dynamic range gain is reached. Moreover, it can be important to take into account technical switching time between windows (about 6 ms on Exploris™) With limited total extra sub-scans duration per cycle, at some point of partitioning, further separation of windows into smaller pieces can lead to actual loss of signal due to the increased burden of technical switch time.

Methods to Implement HDR Scans in the Instrument

In the standard implementation on the Exploris™ instrument, ions from different m/z windows originating from an ion source are filtered by a quadrupole and collected in an ion storage device (C-trap) before being injected into the orbital trapping mass analyser.

However, the following instrumentation could be used to acquire HDR scans:

Parallel filling by storing all ions in a trapping device, periodically releasing them and separating on arrival time according to any type of ion mobility or time-of-flight, gating desired windows and collecting them in a final storage device, with a subsequent injection into an analyser (as described e.g. in U.S. Pat. Nos. 7,829,842, 7,999,223, 9,064,679, 9,293,316, 9,812,310, 10,199,208, 10,224,193).

As above, but with ions scanned out from the first trapping device sequentially, then only desired non-overlapping windows are allowed to pass to the final storage device (as described e.g. in U.S. Pat. Nos. 7,157,698/7,342,224).

Separation of ions by m/z or mobility into an array of storage devices, then releasing ions out of some of them at desired times and selecting non-overlapping windows to transfer to the storage device for subsequent injection into an analyser (as described e.g. in U.S. Pat. Nos. 9,147,563, 9,293,316/9,812,310).

In these alternative methods, a rapidly switching quadrupole or any other mass filter could be used in addition to sharpen the shape of the final windows arriving at the final storage device (C-trap).

Figure 5:
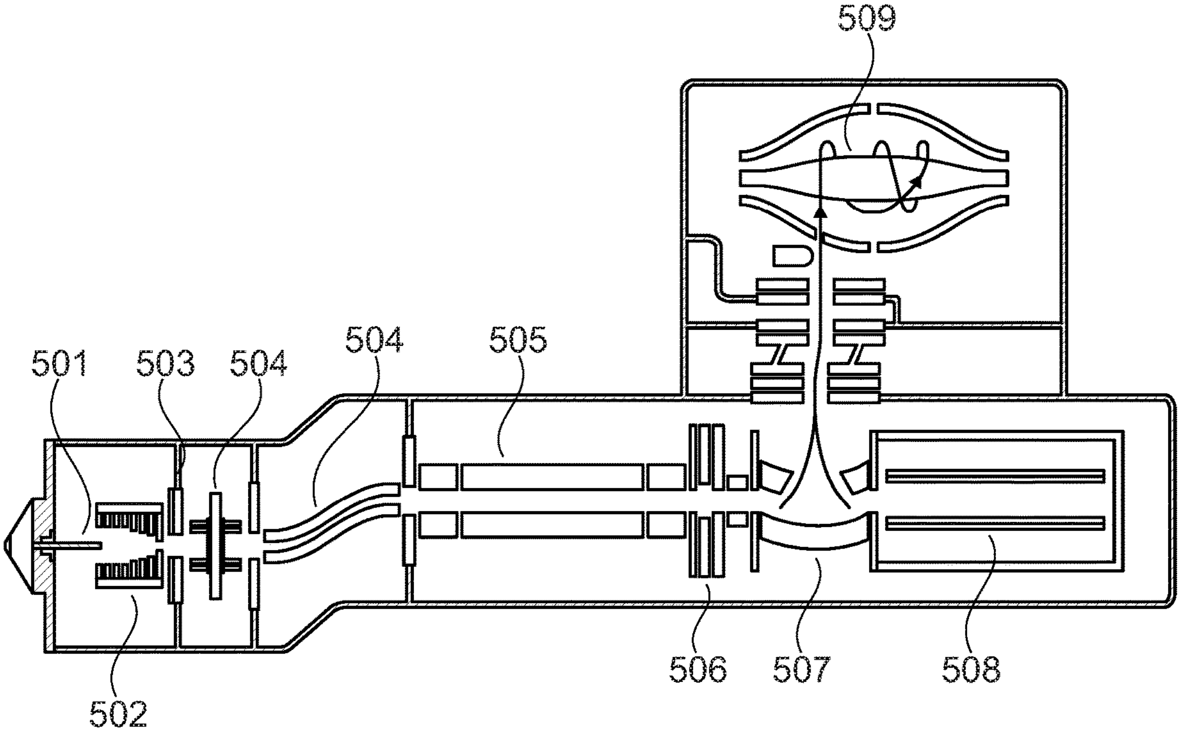
FIG. 5 shows schematically a mass spectrometry system for implementing the methods described herein.

FIG. 5 shows a preferred mass spectrometry system for implementing the methods described herein. The mass spectrometry system is a Thermo Scientific Orbitrap Exploris™ 480 mass spectrometer that is modified to perform the methods described herein. The mass spectrometry system comprises a high capacity transfer tube 501, an electrodynamic ion funnel 502, an EASY-IC internal calibrant source 503, an advanced active beam guide (AABG) 504, advanced quadrupole technology (AQT) 505, an independent charge detector 506, a C-trap 507, an ion routing multipole 508 and an orbital trapping mass analyser 509. The AQT 505 is configured to perform filtering of ions into partitioned m/z sub-ranges as described above. Ions are trapped in the C-trap 507 based on injection times calculated in accordance with the methods described previously. Then, the orbital trapping mass analyser 509 acquires mass spectral data of samples after ions have been filtered. While FIG. 5 is a preferred hardware arrangement, various other types of mass spectrometry system could be used.

It will be appreciated that the above-mentioned methods may be implemented as one or more corresponding modules as hardware and/or software. For example, the above-mentioned functionality may be implemented as one or more software components for execution by a processor of a mass spectrometry system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules. Moreover, multiple method steps implemented in flowcharts contained herein, or as described above, may be implemented together by a single module. Such modules and hardware may be integrated into a mass spectrometry system.

It will be appreciated that, insofar as embodiments of the disclosure are implemented by a computer program, then a storage medium and a transmission medium carrying the computer program form aspects of the disclosure. The computer program may have one or more program instructions, or program code, that, when executed by a computer, causes an embodiment of the disclosure to be carried out. The term "program", as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computing devices, etc.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

Moreover, a number of variations to the described embodiments can be made and will be apparent to a skilled reader upon reading this specification. For instance, while orbital trapping mass analysers have predominantly been described, the mass analysers described herein may be any one or more of: an orbital trapping mass analyser or a trap-based time of flight (ToF), in which ions enter a trap from where they are ejected into a ToF mass analyser.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as an ion or an m/z sub-range) means "one or more" (for instance, one or more ions, or one or more m/z sub-ranges). Throughout the description and claims of this disclosure, the words "comprise", "including", "having" and "contain" and variations of the words, for example "comprising" and "comprises" or similar, mean that the described feature includes the additional features that follow, and are not intended to (and do not) exclude the presence of other components. Moreover, where a first feature is described as being "based on" a second feature, this may mean that the first feature is wholly based on the second feature, or that the first feature is based at least in part on the second feature.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise. Moreover, where a step is described as being performed after a step, this does not preclude intervening steps being performed.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

The following numbered clauses illustrate further advantageous embodiments of the present invention.

1. A method for acquiring mass spectral data of a sample across at least a portion of an m/z range, comprising:
- receiving mass spectral data of the sample across the m/z range;
- partitioning the m/z range into one or more sets of m/z sub-ranges, each set comprising one or more m/z sub-ranges, by:
  - dividing the m/z range into a plurality of m/z bins;
  - determining an indication of ion abundance for each m/z bin, based on the mass spectral data; and
  - forming an m/z sub-range of the one or more sets of m/z sub-ranges by assigning m/z bins having ion abundances that correspond to at least a threshold degree to the formed m/z sub-range; and
- performing a mass analysis on the sample for each set of m/z sub-ranges, thereby acquiring one or more partial mass spectral data sets.

2. The method of clause 1, wherein partitioning the m/z range comprises:
- (i) identifying an initial m/z bin of the plurality of m/z bins;
- (ii) determining that one or more m/z bins adjacent to the initial m/z bin have ion abundances that correspond to the ion abundance of the initial m/z bin to at least a threshold degree; and
- (iii) assigning the initial m/z bin and the one or more m/z bins adjacent to the initial m/z bin to the formed m/z sub-range.

3. The method of clause 2, wherein the initial m/z bin is the m/z bin of the plurality of m/z bins having the highest ion abundance.

4. The method of clause 2 or clause 3, comprising forming a complement of the formed m/z sub-range.

5. The method of clause 4, comprising repeating steps (i), (ii) and (iii) on the complement of the formed m/z sub-range, thereby forming one or more further m/z sub-ranges of the one or more sets of m/z sub-ranges.

6. The method of clause 4 or clause 5, comprising iteratively forming a complement of the formed m/z range and repeating steps (i), (ii) and (iii) on each successive complement, thereby forming a plurality of further m/z sub-ranges of the one or more sets of m/z sub-ranges.

7. The method of any preceding clause, wherein partitioning the m/z range into one or more sets of m/z sub-ranges comprises repeatedly forming m/z sub-ranges until a total number of formed m/z sub-ranges is no greater than a predefined total number of m/z sub-ranges in the one or more sets of m/z sub-ranges.

8. The method of any preceding clause, wherein partitioning the m/z range into one or more sets of m/z sub-ranges comprises forming M sets of m/z sub-ranges each comprising W m/z sub-ranges, wherein the m/z sub-ranges are numbered in order of m/z and wherein the i-th set of m/z sub-ranges comprises m/z sub-range numbers i, M+i, 2M+i, . . . , (W−1)M+i, for each value of i=1, . . . , M.

9. The method of any preceding clause, wherein partitioning the m/z range comprises:
- determining that a first m/z bin and a second m/z bin have ion abundances that correspond to at least a threshold degree;

determining that a third m/z bin between the first m/z bin and the second m/z bin has an ion abundance that does not correspond with the ion abundances of first and second m/z bins to at least the threshold degree; and assigning the first, second and third m/z bins to a single m/z sub-range.

10. The method of any preceding clause, wherein partitioning the m/z range comprises:

assigning m/z bins having ion abundances that correspond to at least a threshold degree to a first preliminary m/z sub-range;

assigning m/z bins having ion abundances that correspond to at least a threshold degree to a second preliminary m/z sub-range;

determining that the first preliminary m/z sub-range overlaps with the second preliminary m/z sub-range; and discarding the second preliminary m/z sub-range without assigning the respective m/z bins to an m/z sub-range of the one or more sets of m/z sub-ranges.

11. The method of any preceding clause, wherein partitioning the m/z range comprises:

forming one or more preliminary m/z sub-ranges by assigning m/z bins having ion abundances that correspond to at least a threshold degree to a respective preliminary m/z sub-range; and forming the one or more m/z sub-ranges of the one or more sets of m/z sub-ranges based on a respective preliminary m/z sub-range.

12. The method of clause 11, wherein forming one or more m/z sub-ranges of the one or more sets of m/z sub-ranges based on a respective preliminary m/z sub-range comprises:

assigning the respective preliminary m/z sub-range to the one or more sets of m/z sub-ranges; and assigning, to the one or more sets of m/z sub-ranges, one or two m/z sub-ranges adjacent to the respective preliminary m/z sub-range, wherein each of the one or two m/z sub-ranges adjacent to the respective preliminary m/z sub-range extends from one end of the respective preliminary m/z sub-range to an end of a further preliminary m/z sub-range;

preferably wherein the method further comprises increasing the width of at least one of the one or two m/z sub-ranges adjacent to the respective preliminary m/z sub-range.

13. The method of any preceding clause, wherein partitioning the m/z range comprises assigning an initial m/z bin and one or more m/z bins adjacent to the initial m/z bin to form a first preliminary m/z sub-range, wherein forming the m/z sub-range comprises at least one of:

forming an m/z sub-range by increasing the width of the first preliminary m/z sub-range; and/or forming an m/z sub-range by increasing the width of existing second preliminary m/z sub-range adjacent to the first preliminary m/z sub-range.

14. The method of clause 13, comprising:

determining that the first preliminary m/z sub-range and a second preliminary m/z sub-range adjacent to the first preliminary m/z sub-range have the same width;

determining which of the first preliminary m/z sub-range and the second preliminary m/z sub-range is associated with a higher ion abundance; and increasing the width of the one of the one of the first preliminary m/z sub-range and the second preliminary m/z sub-range that is associated with the higher ion abundance.

15. The method of clause 13 or clause 14, comprising:

based on determining that the first preliminary m/z sub-range is wider than a second preliminary m/z sub-range adjacent to the first preliminary m/z sub-range, increasing the width of the second preliminary m/z sub-range; or based on determining that the first preliminary m/z sub-range is narrower than the second preliminary m/z sub-range, increasing the width of the first preliminary m/z sub-range.

16. The method of any of clauses 13 to 15, wherein increasing the width of at least one of the first preliminary m/z sub-range and the second preliminary m/z sub-range causes the first and second preliminary m/z sub-ranges to at least partially overlap.

17. The method of clause 16, wherein the first and second preliminary m/z sub-ranges overlap by an amount that:

includes an offset that is proportional to the width of the first or second preliminary m/z sub-range; and/or includes a constant offset.

18. The method of any preceding clause, comprising:

partitioning the m/z range into a plurality of first sets of m/z sub-ranges, each first set comprising one or more m/z sub-ranges;

performing a first mass analysis on the sample for each first set of m/z sub-ranges, thereby acquiring a plurality of first partial mass spectral data sets;

partitioning, based on ion abundances indicated by the plurality of first partial mass spectral data sets, the m/z range into a plurality of second sets of m/z sub-ranges, each second set comprising one or more m/z sub-ranges; and performing a second mass analysis on the sample for each second set of m/z sub-ranges, thereby acquiring a plurality of second partial mass spectral data sets.

19. The method of clause 18, comprising partitioning the m/z range one or more further times and performing one or more further mass analyses to obtain a plurality of respective further partial mass spectral data sets.

20. The method of any preceding clause, wherein:

each of the plurality of m/z bins has a width that is configurable by a user; and/or each of the plurality of m/z bins has a width that is half of a predefined minimum width.

21. The method of any preceding clause, wherein the threshold degree of correspondence between m/z bins is a predefined ratio of an ion abundance of a less abundant m/z bin to an ion abundance of a more abundant m/z bin, preferably wherein the predefined ratio is at least 0.5.

22. The method of any preceding clause, wherein the indication of ion abundance is total ion current (TIC).

23. A method for acquiring mass spectral data of a sample across at least a portion of an m/z range, the m/z range comprising a set of one or more m/z sub-ranges, the method comprising:

determining an initial distribution of injection times comprising an initial injection time for each m/z sub-range of the set of one or more m/z sub-ranges;

based on determining that a total time of the initial distribution of injection times exceeds a total available injection time for acquiring the mass spectral data, determining an adjusted distribution of injection times comprising an adjusted injection time for each m/z sub-range; and performing mass analysis on each m/z sub-range according to the adjusted injection time distribution, so as to obtain a partial mass spectral data set;

wherein determining the adjusted distribution of injection times comprises reducing at least one of the initial injection times for a respective m/z sub-range, such that a total time of the adjusted distribution of injection times for the set of one or more m/z sub-ranges is no greater than the total available injection time for acquiring the mass spectral data.

24. The method of clause 23, wherein determining the adjusted distribution of injection times comprises reducing one or more relatively long initial injection times by a greater extent than one or more relatively short initial injection times.

25. The method of clause 23 or clause 24, wherein determining the adjusted distribution of injection times comprises reducing at least one, and preferably each, initial injection time that exceeds a threshold injection time.

26. The method of any of clauses 23 to 25, wherein determining the adjusted distribution of injection times comprises reducing a plurality of initial injection times that exceed a threshold injection time by a scaling factor.

27. The method of clause 26, wherein determining the adjusted distribution of injection times comprises setting the threshold injection time as the adjusted injection time for each m/z sub-range for which the initial injection time reduced by the scaling factor is less than the threshold injection time.

28. The method of any of clauses 23 to 27, wherein determining the adjusted distribution of injection times comprises:

determining a total spare injection time by summing, for each m/z sub-range for which the initial injection time is less than the threshold injection time, a difference between the initial injection time and the threshold injection time; and setting an adjusted injection time for one or more m/z sub-ranges for which the initial injection time is greater than the threshold injection time, by distributing the total spare injection, thereby increasing the initial injection times for the one or more m/z sub-ranges for which the initial injection time is greater than the threshold injection time.

29. The method of any of clauses 23 to 28, wherein determining the adjusted distribution of injection times comprises:

determining a sum, sum_exceeding, of each initial injection time that exceeds the threshold injection time, wherein the threshold injection time is $IT_{Thr}$;

determining a sum, sum_remaining, by subtracting each initial injection time that is less than or equal to $IT_{Thr}$ from the total available injection time;

processing each initial injection time that exceeds the threshold injection time in ascending order by iteratively:

calculating an adjusted injection time, new_IT, from a respective initial injection time, old_IT, by calculating $$\text{new\_IT} = \max\left(IT_{Thr}, \frac{\text{sum\_remaining}}{\text{sum\_exceeding}} * \text{old\_IT}\right);$$

decreasing sum_exceeding by old_IT; and decreasing sum_remaining by new_IT.

30. The method of any of clauses 23 to 29, wherein the threshold injection time is equal to the total available injection time divided equally between the one or more m/z sub-ranges.

31. The method of any of clauses 23 to 30, further comprising:

receiving an indication that an m/z sub-range is an m/z sub-range of interest; and setting a relatively high adjusted injection time for the m/z sub-range of interest.

32. The method of any of clauses 23 to 31, wherein determining the adjusted distribution of injection times comprises reducing the initial injection times for each respective m/z sub-range.

33. The method of any of clauses 23 to 32, wherein determining the adjusted distribution of injection times comprises reducing the initial injection times for each respective m/z sub-range by a scaling factor.

34. The method of any of clauses 23 to 33, wherein determining the initial distribution of injection times comprises determining an initial injection time for each m/z sub-range based on an automatic gain control (AGC) algorithm.

35. The method of any of clauses 23 to 34, wherein determining the adjusted distribution of injection times comprises adjusting the initial injection time for an m/z sub-range based on an indication of ion abundance for the respective m/z sub-range.

36. The method of any of clauses 23 to 35, wherein determining the adjusted distribution of injection times comprises reducing the initial injection time for an m/z sub-range based on an indication that the ion abundance for the respective m/z sub-range is substantially caused by a single m/z peak.

37. A method for acquiring mass spectral data of a sample across at least a portion of an m/z range, the m/z range comprising a plurality of sets of m/z sub-ranges, each set comprising one or more m/z sub-ranges, comprising:

determining a first set of m/z sub-ranges of the plurality of sets of m/z sub-ranges and determining a second set of m/z sub-ranges of the plurality of sets of m/z sub-ranges, the first set comprising a first m/z sub-range and the second set comprising a second m/z sub-range;

mass filtering the sample to isolate ions in the first set of m/z sub-ranges using a first mass filter and performing mass analysis on the sample across the first set of m/z sub-ranges to obtain a first partial mass spectral data set, the first mass filter having a first response profile corresponding to the first m/z sub-range, the first response profile having a relatively high transmission region and one or more relatively low transmission regions; and mass filtering the sample to isolate ions in the second set of m/z sub-ranges using a second mass filter and performing mass analysis on the sample across the second set of m/z sub-ranges to obtain a second partial mass spectral data set, the second mass filter having a second response profile corresponding to the second m/z sub-range, the second response profile having a relatively high transmission region and one or more relatively low transmission regions;

wherein the step of determining the first and second sets of m/z sub-ranges comprises setting the first and second sets of m/z sub-ranges such that the relatively high transmission region of the first response profile at least partially overlaps the relatively high transmission region of the second response profile.

38. The method of clause 37, wherein determining the first and second sets of m/z sub-ranges comprises:

determining whether the relatively high transmission region of the first response profile at least partially overlaps the relatively high transmission region of the second response profile; and based on determining that the relatively high transmission region of the first response profile does not at least partially overlap the relatively high transmission region of the second response profile, adjusting the first and/or second sets of m/z sub-ranges such that the relatively high transmission region of the first response profile at least partially overlaps the relatively high transmission region of the second response profile.

39. The method of clause 37 or clause 38, wherein:

the first set of m/z sub-ranges comprises a first plurality of m/z sub-ranges and the first mass filter has a plurality of response profiles each comprising, for each m/z sub-range of the first set: a relatively high transmission region; and one or more relatively low transmission regions;

the second set of m/z sub-ranges comprises a second plurality of m/z sub-ranges and the second mass filter has a plurality of response profiles each comprising, for each m/z sub-range of the second set: a relatively high transmission region; and one or more relatively low transmission regions; and the step of determining the first and second sets of m/z sub-ranges comprises setting the first and second sets of m/z sub-ranges such that: each relatively high transmission region of each response profile of the first mass filter at least partially overlaps a relatively high transmission region of a response profile of the second mass filter.

40. The method of any of clauses 37 to 39, wherein each response profile has a relatively high transmission region between a plurality of relatively low transmission regions.

7

41. The method of any of clauses 37 to 40, wherein each response profile is substantially trapezoidal.

42. The method of any of clauses 37 to 41, wherein the first mass filter and the second mass filter are the same mass filter.

43. The method of any of clauses 37 to 42, wherein the first mass filter is a quadrupole and/or wherein the second mass filter is a quadrupole.

44. The method of any of clauses 37 to 43, wherein the relatively high transmission region of the first response profile and/or the second response profile is a region having at least 90% transmission of ions, at least 95% transmission of ions or at least 99% transmission of ions.

45. The method of any of clauses 37 to 44, wherein determining the first and second sets of m/z sub-ranges comprises:

determining a first trapezoidal fit of the first response profile and/or a second trapezoidal fit of the second response profile based on mass spectral data obtained using the first mass filter and the second mass filter; and determining the relatively high transmission region of the first response profile and the relatively high transmission region of the second response profile based on the first and/or second trapezoidal fits.

46. The method of any of clauses 37 to 45, wherein determining the first and second sets of m/z sub-ranges comprises determining a degree of overlap for the first and second response profiles based on a width of at least one of the first and/or the second response profiles.

47. The method of any of clauses 37 to 46, wherein determining the first and second sets of m/z sub-ranges comprises determining a degree of overlap for the first and second response profiles based on a width of a relatively low transmission region of at least one of the first and/or the second response profiles.

48. The method of any of clauses 37 to 47, wherein the relatively high transmission region of the first response profile overlaps the relatively high transmission region of the second response profile by an amount that is greater than: a width of a relatively low transmission region of the first response profile; and/or a width of a relatively low transmission region of the second response profile.

49. A method for acquiring mass spectral data of a sample across at least a portion of an m/z range, comprising performing the method of any of clauses 1 to 22 according to an adjusted injection time distribution for each set of m/z sub-ranges, the adjusted injection time distribution for each set of m/z sub-ranges being determined by performing the method of any of clauses 23 to 36, preferably wherein the method is performed for first and second m/z sub-ranges determined by performing the method of any of clauses 37 to 48.

50. A method for acquiring mass spectral data of a sample across at least a portion of an m/z range, comprising performing the method of any of clauses 1 to 22 for first and second m/z sub-ranges determined by performing the method of any of clauses 37 to 48.

51. A method for acquiring mass spectral data of a sample across at least a portion of an m/z range, comprising performing the method of any of clauses 37 to 48 according to an adjusted injection time distribution for each set of m/z sub-ranges, the adjusted injection time distribution for each set of m/z sub-ranges being determined by performing the method of any of clauses 23 to 36.

52. The method of any preceding clause, wherein each set of m/z sub-ranges comprises a plurality of m/z sub-ranges and wherein each m/z sub-range in a given set of m/z sub-ranges at least partially overlaps an m/z sub-range of a different set of m/z sub-ranges.

53. The method of any preceding clause, wherein each set of m/z sub-ranges comprises m/z sub-ranges having ion abundances that correspond to at least a threshold degree.

54. The method of any preceding clause, wherein at least one set of m/z sub-ranges comprises one or more m/z sub-ranges associated with a relatively high or a relatively low ion abundance in the sample.

55. The method of any preceding clause, wherein at least one mass analysis is performed using instrumental parameters determined based on ion abundances in the sample.

56. The method of any preceding clause, comprising performing mass analysis on one or more m/z sub-ranges of a respective set using different ion optics settings.

57. The method of any preceding clause, wherein each mass analysis is a $MS^1$ mass analysis.

58. The method of any preceding clause, wherein the m/z sub-ranges of each of the sets of m/z sub-ranges collectively span the m/z range.

59. The method of any preceding clause, wherein each set of m/z sub-ranges comprises a plurality of m/z sub-ranges that are spaced apart.

60. The method of any preceding clause, wherein the m/z sub-ranges of each of the plurality of sets of m/z sub-ranges are interleaved along the m/z axis.

61. The method of any preceding clause, wherein each m/z sub-range of a first set of m/z sub-ranges is contiguous with an m/z sub-range of a second set of m/z sub-ranges.

62. The method of any preceding clause, comprising receiving the sample from a chromatograph, preferably comprising repeating the method of any preceding clause one or more times on one or more samples obtained from the chromatograph to obtain time-dependent mass spectral data for the sample.

63. The method of any preceding clause, comprising performing a full-range mass analysis on the sample across the m/z range and adjusting mass spectral data of at least one partial mass spectral data set based on the full-range mass analysis on the sample across the m/z range.

64. The method of any preceding clause, wherein:
- a total number of m/z sub-ranges in each set of m/z sub-ranges is at least one of: constant; configurable by a user; and/or determined based mass spectral data of the sample; and/or
- a total number of sets of m/z sub-ranges in the plurality of sets of m/z sub-ranges is at least one of: constant; configurable by a user; and/or determined dynamically based on mass spectral data of the sample.

65. The method of clause 64, comprising performing an optimisation procedure on the total number of m/z sub-ranges in each set of m/z sub-ranges and/or the number of sets of m/z sub-ranges in the plurality of sets of m/z sub-ranges, wherein the optimisation procedure is based on at least one of: a dynamic range of the mass analysis; and/or a total available time for performing the mass analysis.

66. A method for acquiring mass spectral data of a sample across at least a portion of an m/z range, the method comprising:
- obtaining a plurality of partial mass spectral data sets using the method of any preceding clause; and combining the plurality of partial mass spectral data sets into a single mass spectral data set.

67. The method of clause 66, wherein a first m/z sub-range of a first set of m/z sub-ranges at least partially overlaps one or more further m/z sub-ranges of one or more further sets of m/z sub-ranges.

68. The method of clause 66 or clause 67, wherein each m/z sub-range of the first set of m/z sub-ranges at least partially overlaps an m/z sub-range of a second set of m/z sub-ranges, preferably wherein each m/z sub-range of the first set of m/z sub-ranges at least partially overlaps an m/z sub-range of a third set of m/z sub-ranges.

69. The method of any of clauses 66 to 68, wherein the single mass spectral data set comprises mass spectral data from: a first partial mass spectral data set of the plurality of partial mass spectral data sets; and a second partial mass spectral data set of the plurality of partial mass spectral data sets.

70 The method of any of clauses 66 to 69, wherein combining the plurality of partial mass spectral data sets comprises:
- determining an end-m/z value that is within an intersection of a first m/z sub-range of the first set of m/z sub ranges and a second m/z sub-range of the second set of m/z sub ranges; and
- including in the single mass spectral data set:
  - mass spectral data from between: the end-m/z value; and an endpoint of the first m/z sub-range; and
  - mass spectral data from between: the end-m/z value; and an endpoint of the second m/z sub-range.

71. The method of clause 70, comprising determining the end-m/z value based on a distribution of isotopes in the first and/or the second m/z sub-ranges.

72. The method of clause 70 or clause 71, wherein the intersection of the first m/z sub-range and the second m/z sub-range includes at least a portion of the relatively high transmission region of the first response profile and at least a portion of the relatively high transmission region of the second response profile.

73. The method of any of clauses 66 to 72, comprising a step of determining whether the first partial mass spectral data set is consistent with the second partial mass spectral data set.

74. The method of any of clauses 66 to 73, comprising:
- determining which of the first m/z sub-range and the second m/z sub-range is associated with a higher ion abundance; and
- wherein combining the plurality of partial mass spectral data sets into a single mass spectral data set comprises including in the single mass spectral data set the mass spectral data from the one of the first m/z sub-range and the second m/z sub-range that is associated with the higher ion abundance.

75. The method of any of clauses 66 to 74, comprising:
- determining which of the first m/z sub-range and the second m/z sub-range is associated with a higher signal-to-noise ratio; and
- wherein combining the plurality of partial mass spectral data sets into a single mass spectral data set comprises including in the single mass spectral data set the mass spectral data from the one of the first m/z sub-range and the second m/z sub-range that is associated with the higher signal-to-noise ratio.

76. A mass spectrometry system comprising a mass analyser, a processor and one or more mass filters, configured to perform the method of any preceding clause.

77. A computer program comprising instructions that, when executed by the processor of the mass spectrometry system of clause 76, cause the mass spectrometry system to perform the method of any of clauses 1 to 75.

78. A computer-readable medium having stored thereon the computer program of clause 77.

We claim:

1. A method for acquiring mass spectral data of a sample across at least a portion of an m/z range, comprising:
- receiving mass spectral data of the sample across the m/z range;
- partitioning the m/z range into one or more sets of m/z sub-ranges, each set comprising one or more m/z sub-ranges, by:
  - dividing the m/z range into a plurality of m/z bins;
  - determining an indication of ion abundance for each m/z bin, based on the mass spectral data; and
  - forming an m/z sub-range of the one or more sets of m/z sub-ranges by assigning m/z bins having ion abundances that correspond to at least a threshold degree to the formed m/z sub-range; and
- performing a mass analysis on the sample for each set of m/z sub-ranges, thereby acquiring one or more partial mass spectral data sets.

2. The method of claim 1, wherein partitioning the m/z range comprises:
- (i) identifying an initial m/z bin of the plurality of m/z bins;
- (ii) determining that one or more m/z bins adjacent to the initial m/z bin have ion abundances that correspond to the ion abundance of the initial m/z bin to at least a threshold degree; and
- (iii) assigning the initial m/z bin and the one or more m/z bins adjacent to the initial m/z bin to the formed m/z sub-range.

3. The method of claim 2, wherein the initial m/z bin is an m/z bin of the plurality of m/z bins having the highest ion abundance.

4. The method of claim 2, comprising forming a complement of the formed m/z sub-range.

5. The method of claim 4, comprising:

repeating steps (i), (ii) and (iii) on the complement of the formed m/z sub-range, thereby forming one or more further m/z sub-ranges of the one or more sets of m/z sub-ranges; and/or iteratively forming a complement of the formed m/z range and repeating steps (i), (ii) and (iii) on each successive complement, thereby forming a plurality of further m/z sub-ranges of the one or more sets of m/z sub-ranges.

6. The method of claim 1, wherein partitioning the m/z range into one or more sets of m/z sub-ranges comprises repeatedly forming m/z sub-ranges until a total number of formed m/z sub-ranges is no greater than a predefined total number of m/z sub-ranges in the one or more sets of m/z sub-ranges.

7. The method of claim 6, wherein partitioning the m/z range into one or more sets of m/z sub-ranges comprises forming M sets of m/z sub-ranges each comprising W m/z sub-ranges, wherein the m/z sub-ranges are numbered in order of m/z and wherein an i-th set of m/z sub-ranges comprises m/z sub-range numbers i, M+i, 2M+i, . . . , (W−1)M+i, for each value of i=1, . . . , M.

8. The method of claim 1, wherein partitioning the m/z range comprises:

determining that a first m/z bin and a second m/z bin have ion abundances that correspond to at least a threshold degree;

determining that a third m/z bin between the first m/z bin and the second m/z bin has an ion abundance that does not correspond with the ion abundances of first and second m/z bins to at least the threshold degree; and assigning the first, second and third m/z bins to a single m/z sub-range.

9. The method of claim 1, wherein partitioning the m/z range comprises:

assigning m/z bins having ion abundances that correspond to at least a threshold degree to a first preliminary m/z sub-range;

assigning m/z bins having ion abundances that correspond to at least a threshold degree to a second preliminary m/z sub-range;

determining that the first preliminary m/z sub-range overlaps with the second preliminary m/z sub-range; and discarding the second preliminary m/z sub-range without assigning the respective m/z bins to an m/z sub-range of the one or more sets of m/z sub-ranges.

10. The method of claim 1, wherein partitioning the m/z range comprises:

forming one or more preliminary m/z sub-ranges by assigning m/z bins having ion abundances that correspond to at least a threshold degree to a respective preliminary m/z sub-range; and forming the one or more m/z sub-ranges of the one or more sets of m/z sub-ranges based on a respective preliminary m/z sub-range.

11. The method of claim 10, wherein forming one or more m/z sub-ranges of the one or more sets of m/z sub-ranges based on a respective preliminary m/z sub-range comprises:

assigning the respective preliminary m/z sub-range to the one or more sets of m/z sub-ranges;

assigning, to the one or more sets of m/z sub-ranges, one or two m/z sub-ranges adjacent to the respective preliminary m/z sub-range, wherein each of the one or two m/z sub-ranges adjacent to the respective preliminary m/z sub-range extends from one end of the respective preliminary m/z sub-range to an end of a further preliminary m/z sub-range; and wherein the method further comprises increasing a width of at least one of the one or two m/z sub-ranges adjacent to the respective preliminary m/z sub-range.

12. The method of claim 1, wherein partitioning the m/z range comprises assigning an initial m/z bin and one or more m/z bins adjacent to the initial m/z bin to form a first preliminary m/z sub-range, wherein forming the m/z sub-range comprises at least one of:

forming an m/z sub-range by increasing a width of the first preliminary m/z sub-range; and/or forming an m/z sub-range by increasing a width of a second preliminary m/z sub-range adjacent to the first preliminary m/z sub-range.

13. The method of claim 12, comprising:

determining that the first preliminary m/z sub-range and a second preliminary m/z sub-range adjacent to the first preliminary m/z sub-range have the same width;

determining which of the first preliminary m/z sub-range and the second preliminary m/z sub-range is associated with a higher ion abundance; and increasing the width of the one of the first preliminary m/z sub-range and the second preliminary m/z sub-range that is associated with the higher ion abundance.

14. The method of claim 12, further comprising:

based on determining that the first preliminary m/z sub-range is wider than a second preliminary m/z sub-range adjacent to the first preliminary m/z sub-range, increasing the width of the second preliminary m/z sub-range; or based on determining that the first preliminary m/z sub-range is narrower than the second preliminary m/z sub-range, increasing the width of the first preliminary m/z sub-range.

15. The method of claim 12, wherein increasing the width of at least one of the first preliminary m/z sub-range and the second preliminary m/z sub-range causes the first and second preliminary m/z sub-ranges to at least partially overlap;

preferably wherein the first and second preliminary m/z sub-ranges overlap by an amount that:

includes an offset that is proportional to the width of the first or second preliminary m/z sub-range; and/or includes a constant offset.

16. The method of claim 1, further comprising:

partitioning the m/z range into a plurality of first sets of m/z sub-ranges, each first set comprising one or more m/z sub-ranges;

performing a first mass analysis on the sample for each first set of m/z sub-ranges, thereby acquiring a plurality of first partial mass spectral data sets;

partitioning, based on ion abundances indicated by the plurality of first partial mass spectral data sets, the m/z range into a plurality of second sets of m/z sub-ranges, each second set comprising one or more m/z sub-ranges;

performing a second mass analysis on the sample for each second set of m/z sub-ranges, thereby acquiring a plurality of second partial mass spectral data sets; and further comprising partitioning the m/z range one or more further times and performing one or more further mass analyses to obtain a plurality of respective further partial mass spectral data sets.

17. The method of claim 1, wherein:
each of the plurality of m/z bins has a width that is configurable by a user; and/or
each of the plurality of m/z bins has a width that is half of a predefined minimum width.

18. The method of claim 1, wherein:
the threshold degree of correspondence between m/z bins is a predefined ratio of an ion abundance of a less abundant m/z bin to an ion abundance of a more abundant m/z bin, preferably wherein the predefined ratio is at least 0.5; and/or
the indication of ion abundance is total ion current (TIC); and/or
each set of m/z sub-ranges comprises a plurality of m/z sub-ranges and wherein each m/z sub-range in a given set of m/z sub-ranges at least partially overlaps an m/z sub-range of a different set of m/z sub-ranges.

19. The method of claim 1, comprising performing mass analysis on one or more m/z sub-ranges of a respective set using different ion optics settings.

20. The method of claim 1, wherein:
each mass analysis is a $MS^1$ mass analysis; and/or
the m/z sub-ranges of each of the sets of m/z sub-ranges collectively span the m/z range.

21. A method for acquiring mass spectral data of a sample across at least a portion of an m/z range, the method comprising:
obtaining a plurality of partial mass spectral data sets using the method of claim 1; and
combining the plurality of partial mass spectral data sets into a single mass spectral data set.

22. The method of claim 21, wherein combining the plurality of partial mass spectral data sets comprises:
determining an end-m/z value that is within an intersection of a first m/z sub-range of the first set of m/z sub ranges and a second m/z sub-range of the second set of m/z sub ranges; and
including in the single mass spectral data set:
mass spectral data from between: the end-m/z value; and an endpoint of the first m/z sub-range; and
mass spectral data from between: the end-m/z value; and an endpoint of the second m/z sub-range;
preferably wherein:
the method comprises determining the end-m/z value based on a distribution of isotopes in the first and/or the second m/z sub-ranges; and/or
the intersection of the first m/z sub-range and the second m/z sub-range includes at least a portion of a relatively high transmission region of a first response profile and at least a portion of a relatively high transmission region of a second response profile.

23. The method of claim 22, further comprising:
determining which of the first m/z sub-range and the second m/z sub-range is associated with a higher ion abundance; and wherein combining the plurality of partial mass spectral data sets into a single mass spectral data set comprises including in the single mass spectral data set the mass spectral data from the one of the first m/z sub-range and the second m/z sub-range that is associated with the higher ion abundance; and/or
determining which of the first m/z sub-range and the second m/z sub-range is associated with a higher signal-to-noise ratio; and wherein combining the plurality of partial mass spectral data sets into a single mass spectral data set comprises including in the single mass spectral data set the mass spectral data from the one of the first m/z sub-range and the second m/z sub-range that is associated with the higher signal-to-noise ratio.

24. A mass spectrometry system comprising a mass analyser, a processor and one or more mass filters, configured to perform the method of claim 1.

25. A computer-readable medium having stored thereon processor-executable instructions for the method of claim 23.

26. A computer-readable medium having stored thereon processor-executable instructions for the method of claim 1.

* * * * *